(12) United States Patent
Ohmori et al.

(10) Patent No.: US 7,553,474 B2
(45) Date of Patent: Jun. 30, 2009

(54) METHOD FOR PRODUCING METAL OXIDE SOL

(75) Inventors: Yutaka Ohmori, Sodegaura (JP); Hirokazu Kato, Sodegaura (JP); Yoshinari Koyama, Sodegaura (JP); Kenji Yamaguchi, Sodegaura (JP)

(73) Assignee: Nissan Chemical Industries, Ltd., Tokyo (JP)

( * ) Notice: Subject to any disclaimer, the term of this patent is extended or adjusted under 35 U.S.C. 154(b) by 104 days.

(21) Appl. No.: 11/660,086

(22) PCT Filed: Aug. 8, 2005

(86) PCT No.: PCT/JP2005/014526

§ 371 (c)(1),
(2), (4) Date: Mar. 13, 2007

(87) PCT Pub. No.: WO2006/019004

PCT Pub. Date: Feb. 23, 2006

(65) Prior Publication Data

US 2008/0138272 A1    Jun. 12, 2008

(30) Foreign Application Priority Data

Aug. 17, 2004  (JP) .............................. 2004-237311
Jun. 29, 2005  (JP) .............................. 2005-190454

(51) Int. Cl.
| | |
|---|---|
| *B01J 37/03* | (2006.01) |
| *B01J 37/06* | (2006.01) |
| *B01J 37/08* | (2006.01) |
| *C01B 13/14* | (2006.01) |
| *C01B 13/32* | (2006.01) |
| *C01B 33/12* | (2006.01) |
| *C01B 33/141* | (2006.01) |
| *C01B 33/148* | (2006.01) |
| *C01B 33/18* | (2006.01) |
| *C01F 1/00* | (2006.01) |
| *C01G 1/02* | (2006.01) |
| *C01G 23/053* | (2006.01) |
| *B01J 21/00* | (2006.01) |
| *B01J 23/00* | (2006.01) |
| *C01F 5/02* | (2006.01) |
| *C01F 7/02* | (2006.01) |
| *C01F 11/02* | (2006.01) |
| *C01G 9/02* | (2006.01) |
| *C01G 19/02* | (2006.01) |
| *C01G 23/047* | (2006.01) |
| *C01G 25/02* | (2006.01) |
| *C01G 49/02* | (2006.01) |
| *C01G 51/04* | (2006.01) |
| *C01G 53/04* | (2006.01) |

(52) U.S. Cl. .................. 423/592.1; 423/69; 423/71; 423/81; 423/89; 423/98; 423/99; 423/100; 423/109; 423/111; 423/112; 423/115; 423/131; 423/138; 423/139; 423/150.1; 423/155; 423/157; 423/335; 423/594.1; 423/594.2; 423/594.3; 423/594.4; 423/594.16; 423/594.19; 423/608; 423/610; 423/618; 423/622; 423/624; 423/625; 423/630; 423/632; 423/635; 423/636; 423/637; 502/325; 502/328; 502/329; 502/332; 502/335; 502/336; 502/337; 502/338; 502/340; 502/343; 502/349; 502/350; 502/351; 502/352; 502/355

(58) Field of Classification Search .................. 502/325, 502/328, 329, 332, 335–338, 340–343, 349–352, 502/355; 423/69, 71, 81, 89, 98–100, 109, 423/111, 112, 335, 592.1, 594.1, 594.3, 594.16, 423/594.19, 608, 610, 618, 622, 624, 625, 423/630, 632, 635–637
See application file for complete search history.

(56) References Cited

U.S. PATENT DOCUMENTS

| | | | | |
|---|---|---|---|---|
| 4,775,412 | A | * | 10/1988 | Nishikura et al. ............. 516/91 |
| 4,828,813 | A | * | 5/1989 | Moorehead .................. 423/713 |
| 5,278,106 | A | | 1/1994 | Nakashima et al. |
| 5,897,958 | A | * | 4/1999 | Yamada et al. .............. 446/474 |
| 6,214,306 | B1 | * | 4/2001 | Aubert et al. ............ 423/213.2 |
| 6,506,705 | B2 | * | 1/2003 | Blanchard et al. ........... 502/300 |

| | 7,235,224 B2 * | 6/2007 | Myeong et al. .......... 423/592.1 |
|---|---|---|---|

FOREIGN PATENT DOCUMENTS

| JP | A-60-176920 | 9/1985 |
|---|---|---|
| JP | A-64-083519 | 3/1989 |
| JP | B2-02-058213 | 12/1990 |
| JP | A-03-174325 | 7/1991 |
| JP | B2-04-045453 | 7/1992 |
| JP | A-08-208228 | 8/1996 |
| JP | B2-2555475 | 9/1996 |
| JP | B2-3250243 | 11/2001 |
| JP | A-2003-026422 | 1/2003 |

\* cited by examiner

*Primary Examiner*—Timothy C Vanoy
*Assistant Examiner*—Serena L Hanor
(74) *Attorney, Agent, or Firm*—Oliff & Berridge, PLC

(57) ABSTRACT

It is an object to provide a method for producing stable alkaline metal oxide sols having a uniform particle size distribution. The method comprises the steps of: heating a metal compound at a temperature of 60° C. to 110° C. in an aqueous medium that contains a carbonate of quaternary ammonium; and carrying out hydrothermal processing at a temperature of 110° C. to 250° C. The carbonate of quaternary ammonium is $(NR_4)_2CO_3$ or $NR_4HCO_3$ in which R represents a hydrocarbon group, or a mixture thereof. The metal compound is one, or two or more metal compounds selected from a group of compounds based on a metal having a valence that is bivalent, trivalent, or tetravalent.

12 Claims, 12 Drawing Sheets

100 nm 100 nm 100 nm 100 nm 100 nm 100 nm 100 nm 100 nm 100 nm

METHOD FOR PRODUCING METAL OXIDE SOL

TECHNICAL FIELD

The present invention relates to a method for producing metal oxide sols and provides a method for producing metal oxide sols that are alkaline and stable.

BACKGROUND ART

Conventional methods for producing metal oxide sols, such as a zirconia sol, for example, include a method in which an aqueous solution of a zirconium salt is hydrolyzed with heating, a method in which hydrogen peroxide is added to an aqueous solution of a zirconium salt and the solution is heated, a method in which zirconium hydroxide is heated in the basic region, and the like.

A method has been described in Japanese Patent Application Publication No. JP-A-3-174325 (Claims) in which a reaction product of zirconium ammonium carbonate and a chelating agent (for example, an oxyphenol, an amino alcohol, an oxylate, a polycarboxylic acid, an oxyaldehyde, an amino acid, or a β-diketone) is hydrolyzed.

A method for producing a basic zirconia sol has been described in Japanese Patent Application Publication No. JP-A-64-83519 (Claims) in which an aqueous suspension containing crystallized zirconia is produced by holding an aqueous suspension containing zirconium hydroxide in a heated state at a temperature of at least 80° C. until the extent of crystallization of the zirconia that is formed reaches 80% or higher. A basic compound containing nitrogen (primary amine, secondary amine, or quaternary ammonium hydroxide), or a hydroxide of an alkaline metal or an alkaline earth metal, is then added to the aqueous suspension containing crystallized zirconia to manufacture the basic zirconia sol.

A method for producing a zirconia sol has been described in Japanese Patent Application Publication No. JP-A-60-176920 (Claims) in which a base is added to an aqueous solution of a zirconium salt to cause precipitation, and a suspension is produced by adding a hydroxide of an alkaline earth metal, or an aqueous solution thereof. The suspension is then heat aged at a temperature of 90° C. to 200° C. to form the zirconia sol.

DISCLOSURE OF THE INVENTION

Problems to be Solved by the Invention

Various methods for producing metal oxide sols, typified by zirconia sols, have been proposed, but in many of the producing methods, a metal compound such as a zirconium salt or the like is hydrolyzed in the acidic region and heated. However, a metal oxide sol, such as a zirconia sol or the like, that is produced by such a method is stable only when its pH is in the acidic region. If the pH is in the neutral or alkaline region, the viscosity of the sol increases, or the sol forms a gel, so that it cannot be used as a sol. Also, in a case where a metal oxide sol, such as a zirconia sol or the like, that is produced by such a method is used as a coating or the like for a metal material, corrosion becomes a problem due to the acid in the sol, making the sol difficult to use. Therefore, a metal oxide sol, such as a zirconia sol or the like, that is stable in the neutral and alkaline regions is desired.

On the other hand, with a method in which a metal compound such as a zirconium salt or the like is hydrolyzed in the alkaline region using ammonium carbonate or an alkali hydroxide, although particles are formed, a large amount of sediment is formed as time passes, forming a slurry, so that a completely stable sol cannot be produced.

In consideration of these circumstances, the present invention proposes a method for producing stable metal oxide sols with a uniform particle size distribution by hydrolyzing a metal compound such as a zirconium salt or the like in the alkaline region, then carrying oat heat aging and hydrothermal processing of the hydrolysates.

Means for Solving the Problem

According to the first aspect of the present invention, the method for producing metal oxide sols includes a process that heats a metal compound at a temperature of 60° C. to 110° C. in an aqueous medium that contains a carbonate of quaternary ammonium and a process that carries out hydrothermal processing at a temperature of 110° C. to 250° C.

According to the second aspect of the present invention, in the method for producing metal oxide sols described by the first aspect, the carbonate of quaternary ammonium is $(NR_4)_2CO_3$ or $NR_4HCO_3$ in which R represents a hydrocarbon group, or a mixture thereof.

According to the third aspect of the present invention, in the method for producing metal oxide sols described by any one of the first aspect and the second aspect, the quaternary ammonium ion in the carbonate of quaternary ammonium includes a hydrocarbon group containing from one to eighteen carbon atoms.

According to the fourth aspect of the present invention, in the method for producing metal oxide sols described by any one of the first aspect and the second aspect, the quaternary ammonium ion in the carbonate of quaternary ammonium includes a hydrocarbon group containing from one to four carbon atoms.

According to the fifth aspect of the present invention, in the method for producing metal oxide sols described by any one of the first aspect through the fourth aspect, the metal compound is one, or two or more metal compounds selected from a group of compounds based on a metal having a valence that is bivalent, trivalent, or tetravalent.

According to the sixth aspect of the present invention, in the method for producing metal oxide sols described by the filth aspect, the metal compound based on a metal having a valence that is bivalent, is at least one of a magnesium compound, a calcium compound, a barium compound, a zinc compound, and a nickel compound.

According to the seventh aspect of the present invention, in the method for producing metal oxide sols described by the fifth aspect, the metal compound based on a metal having a valence that is trivalent, is at least one of an yttrium compound, an aluminum compound, an indium compound, an iron compound, a cobalt compound, a cerium compound, and a bismuth compound.

According to the eighth aspect of the present invention, in the method for producing metal oxide sols described by the fifth aspect, the metal compound based on a metal having a valence that is tetravalent, is at least one of a titanium compound, a zirconium compound, a silicon compound, a tin compound, and a cerium compound.

According to the ninth aspect of the present invention, in the method for producing metal oxide sols described by any one of the first aspect through the fourth aspect, the metal compound is at least one of a calcium compound, an aluminum compound, an yttrium compound, a cerium compound, a tin compound, a zirconium compound, and a combination thereof.

According to the tenth aspect of the present invention, in the method for producing metal oxide sols described by any one of the first aspect through the fifth aspect, the metal oxide is at least one of a single metal oxide and a composite metal oxide.

According to the eleventh aspect of the present invention, the method for producing metal oxide sols described by any one of the first aspect through the tenth aspect further includes a washing process after the heating process.

According to the twelfth aspect of the present invention, the method for producing metal oxide sols described by the eleventh aspect further includes a concentrating process after the washing process, after which processes the pH of the metal oxide sol is 8 to 11.

EFFECT OF THE INVENTION

In the method for producing metal oxide sols according to the present invention, heating the metal compound in an alkaline aqueous medium containing a carbonate of quaternary ammonium causes hydrolysis to proceed, accompanied by the generation of amines and gases such as carbon dioxide and the like. The resulting metal ions and ionic metal compounds are stabilized by interaction with the quaternary ammonium ions that come from the carbonate of quaternary ammonium. It is possible to manufacture a stable alkaline metal oxide sol by carrying out hydrothermal processing of the hydrolysis solution in this state at a temperature of 110° C. or higher.

The alkaline metal oxide sols produced by the present invention can be used for various applications. A zirconia sol can, for example, be used as a raw material for ceramics, for electronic materials such as sensors or the like, and for other materials, as a coating agent, as a ceramic composite material, as a binder for flame-resistant molded products and casting molds, as an abrading agent, and the like. An alumina sol can, for example, be used as a binder for flame-resistant materials, as a paper-making material, as a surface treatment agent for fiber, as a catalyst carrier, as a binder for paints, as an abrading agent, and the like. A ceria sol can, for example, be used as a catalyst carrier, as a glass additive, as an abrading agent, as an ultraviolet light blocking material, and the like. A composite oxide sol can, for example, be used as a fine ceramic material ($ZrO_2$—$CaO$ type, $ZrO_2$—$Y_2O_3$ type) or a fuel cell material ($ZrO_2$—$CaO$ type, $ZrO_2$—$Y_2O_3$ type). Also, a $ZrO_2$—$SnO_2$ type composite oxide sol, when mixed with a silane coupling agent, using an organic solvent instead of a dispersant, can be used as a coating agent that is used as a material that adjusts the refractive index of a lens surface.

BEST MODES FOR CARRYING OUT THE INVENTION

The present invention is a method for producing metal oxide sols, including a process that heats a metal compound at 60° C. to 110° C. in an aqueous medium containing a carbonate of quaternary ammonium and a process that carries out hydrothermal processing at 110° C. to 250° C.

Examples of the carbonate of quaternary ammonium include $(NR_4)_2CO_3$ and $NR_4HCO_3$ wherein R represents a hydrocarbon group, which can be used singly or in combination. Examples of the quaternary ammonium ion in the carbonate of quaternary ammonium include quaternary ammonium ions having hydrocarbon groups containing from one to eighteen carbon atoms. Examples of the hydrocarbon group include saturated and unsaturated chain hydrocarbon groups, as well as aliphatic cyclic and aromatic cyclic hydrocarbon groups. Examples of the saturated or unsaturated chain hydrocarbon group include a methyl group, an ethyl group, a propyl group, an isopropyl group, an octyl group, a decyl group, an octadecyl group, an ethynyl group, a propenyl group, and the like. Examples of the cyclic hydrocarbon group include a phenyl group, a tolyl group, a styryl group, a benzyl group, a naphthyl group, an antolyl group and the like. Among these quaternary ammonium ions, a hydrocarbon group containing from one to four carbon atoms is preferable, such as a methyl group, an ethyl group, a propyl group, or an isopropyl group, for example. A tetramethyl ammonium hydrogen carbonate containing four methyl groups is particularly suitable for use.

In the present invention, if a carbonate containing an ammonium ion other than the quaternary ammonium ion is used as the carbonate, a stable metal oxide sol cannot be produced. For example, if a tertiary ammonium ion such as $(CH_3)_3HN$ or the like, a secondary ammonium ion such as $(CH_3)_2H_2N$ or the like, a primary ammonium ion such as $(CH_3)H_3N$ or the like, or the $NH_4$ ammonium ion is used, a sufficiently stable metal oxide sol cannot be produced.

Nickel compounds include, for example, nickel chloride ($NiCl_2$), nickel sulfate ($NiSO_4$), nickel nitrate $Ni(NO_3)_2$), nickel ammonium sulfate (($NH_4)_2Ni(SO_4)_2$), nickel ammonium chloride ($NH_4Cl.NiCl_2$), hexa-aqua nickel chloride complex (($Ni(OH_2)_6)Cl_2$), nickel sulfamate ($Ni(NH_2SO_4)_2 \cdot 4H_2O$), nickel acetate ($Ni(CH_3COO)_2$), nickel formate ($Ni(HCOO)_2.2H_2O$), and the like.

Compounds based on a metal having a valence that is trivalent include, for example, yttrium compounds, aluminum compounds, indium compounds, iron compounds, cobalt compounds, cerium compounds, bismuth compounds, and the like.

Yttrium compounds include, for example, yttrium chloride ($YCl_3$), yttrium bromide ($YBr_3$), yttrium nitrate ($Y(NO_3)_3$), yttrium sulfate ($Y_2(SO_4)_3$), yttrium carbonate ($Y_2(CO_3)_3 \cdot 3H_2O$), yttrium oxalate ($Y_2(C_2O_4)_3.9H_2O$), and the like.

Aluminum compounds include, for example, aluminum hydroxide ($Al(OH)_3$), basic aluminum acetate ($Al(OH)(CH_3COO)_2$), and the like.

Indium compounds include, for example, indium chloride ($InCl_3$), indium bromide ($InBr_3$), indium nitrate ($In(NO_3)_3$), indium sulfate ($In_2(SO_4)_3$), indium acid potassium ($KInO_3$), and the like.

Iron compounds include, for example, iron chloride ($FeCl_3$), iron nitrate ($Fe(NO_3)_3$), iron sulfate ($Fe_2(SO_4)_3$), and the like.

Cobalt compounds include, for example, cobalt acetate ($Co(CH_3COO)_3$), cobalt sulfate ($Co(SO_4)_3.18H_2O$), hexaanmine cobalt chloride complex (($Co(NH_3)_6)Cl_3$), hexa-anmine cobalt acetate complex (($Co(NH_3)_6)(CH_3COO)_3$), and the like.

Cerium compounds include, for example, cerium carbonate ($Co(CO_3)_3$), cerium nitrate ($Ce(NO_3)_3$), cerium sulfate ($Ce(SO_4)_3$), cerium hydroxide ($Ce(OH)_3$), cerium oxalate ($Ce(C_2O_4)_3$), cerium acetate ($Ce(CH_3COO)_3$), and the like.

Bismuth compounds include, for example, bismuth nitrate ($Bi(NO_3)_3.5H_2O$), bismuth sulfate ($Bi(SO_4)_3$), bismuth chloride ($BiCl_3$), bismuth bromide ($BiBr_3$), sodium bismuthate ($NaBiO_3$), and the like.

Compounds based on a metal having a valence that is tetravalent include, for example, titanium compounds, zirconium compounds, silicon compounds, tin compounds, cerium compounds, and the like.

Titanium compounds include, for example, titanium sulfate ($Ti(SO_4)_2$), titanic acid ($H_4TiO_4$), tetra-isopropyl titanate (Ti(OC$_3$H$_7$)$_4$), tetra-butyl titanate (Ti(OC$_4$H$_9$)$_4$), potassium metatitanate (K$_2$Ti$_2$O$_5$), and the like.

Zirconium compounds include, for example, zirconium nitrate (Zr(NO$_3$)$_4$), zirconium oxychloride (ZrOCl$_2$), zirconium oxynitrate (ZrO(NO$_3$)$_2$), zirconium oxysulfate (ZrO(SO$_4$)), zirconium oxycarbonate (ZrO(CO$_3$)), and the like.

Silicon compounds include, for example, silicic acid (Si(OH)), ethyl silicate (Si(OC$_2$H$_5$)$_4$), sodium silicate (NaSiO$_3$), and the like.

Tin compounds include, for example, tin nitrate (Sn(NO$_3$)$_4$), tin sulfate (Sn(SO$_4$)$_2$), potassium stannate (K$_2$SnO$_3$), sodium stannate (Na$_2$SnO$_3$), orthostannic acid (H$_4$SnO$_4$), metastannic acid (H$_2$SnO$_3$), hexa-hydro-oxo-stannic acid (H$_2$(Sn(OH)$_6$), and the like.

Cerium compounds include, for example, cerium hydroxide (Ce(OH)$_4$), cerium sulfate (Ce(SO$_4$)$_2$), cerium potassium nitrate (K$_2$Ce(NO$_3$)$_6$), cerium ammonium nitrate ((NH$_4$)$_2$Ce(NO$_3$)$_6$), and the like.

Suitable metal compounds that are used include calcium compounds, aluminum compounds, yttrium compounds, cerium compounds, tin compounds, zirconium compounds, and combinations of these compounds.

In the present invention, the carbonate of quaternary ammonium is added to an aqueous medium to make the aqueous medium alkaline. If quaternary ammonium hydroxide is used instead of the carbonate of quaternary ammonium, a sufficiently stable metal oxide sol is not produced, and the medium assumes a slurry state that is separated into two layers. Also, if a different alkali source, such as sodium hydroxide or the like, is used to make the aqueous medium alkaline, stable hydrolysates of the metal compounds are not produced, and a stable metal oxide sol is not produced even if the hydrolysates are treated by hydrothermal processing. However, it is possible to use the carbonate of quaternary ammonium together with another alkali source (for example, a water-soluble inorganic salt such as sodium hydroxide, potassium hydroxide, lithium hydroxide, ammonia, or the like; an amine such as n-propylamine, monoethanolamine, triethanolamine, or the like; or a water-soluble organic salt such as monomethyl-triethyl ammonium hydroxide, tetramethyl ammonium hydroxide, or the like) or with another carbonate other than the carbonate of quaternary ammonium, such as ammonium carbonate or the like. If a mixture of alkaline substances is used, it is desirable for the mass ratio of the carbonate of quaternary ammonium to the other alkaline substance to be in the range from 1:0.01 to 1:1.

A first process of the present invention is a process in which a zirconium salt is heated at a temperature of 60° C. to 110° C. in an aqueous medium that contains the carbonate of quaternary ammonium.

The pH of the aqueous medium used in the first process is from 9 to 12, and the amount of the carbonate of quaternary ammonium contained in the aqueous medium is 3 to 50 mass percent. Also, the amount of the metal compound in the aqueous medium is 1 to 20 mass percent, as converted to metal oxide (MO$_X$, where M is a metallic element). In the first process, if the heating temperature is not higher than 60° C., hydrolysis does not proceed sufficiently to produce a stable metal oxide sol, even if the hydrolysates are treated by hydrothermal processing. Also, if the heating temperature is 110° C. or higher, there is no aging time for hydrolysis, because hydrothermal processing starts immediately, which is not desirable. The first process is ordinarily carried out for 1 to 20 hours.

A second process of the present invention is a process in which hydrothermal processing is carried out after the first process at a temperature of 110° C. to 250° C. Sufficient hydrothermal processing does not occur at a temperature that is not higher than 110° C., and at a temperature of 250° C. or higher, large-scale equipment is required. The hydrothermal processing is carried out using an autoclave. The second process is ordinarily carried out for 1 to 20 hours. The hydrothermal processing causes the hydrolysates of the metal compound to form metal oxide particles. The metal oxide particles that are produced by this process range in size from 2 nm to 500 nm as observed through a transmission electron microscope.

The second process yields an alkaline liquid with a pH of 8 to 12. The liquid can be adequately used as a metal oxide sol in this form, but unnecessary salts can be removed by applying a third process in which the liquid is cleaned with pure water using an ultrafiltration device or the like. A highly pure alkaline metal oxide sol can thus be produced.

The physical properties of the alkaline metal oxide sol produced by the third process are a pH of 8 to 11, a specific surface area of 50 m$^2$/g to 300 m$^2$/g, a concentration of 3 to 60 mass percent, an electrical conductivity of 1000 μS/cm to 10,000 μS/cm, and a viscosity of 1 mPa·s to 300 mPa·s. Also, the particle size distribution is in the range of 2 nm to 500 mm.

Also, the third process discharges a filtrate that contains the carbonate of quaternary ammonium. The filtrate contains only a large amount of the carbonate of quaternary ammonium constituent and a small amount of the metal oxide constituent. Almost all of the carbonate of quaternary ammonium constituent exists in its original unhydrolyzed form, despite having gone through the first and second processes. It is therefore possible to reuse the filtrate, by itself or together with new carbonate of quaternary ammonium, as the aqueous medium in the first process and the second process of the present invention. Using the filtrate repeatedly in this manner makes it possible to reduce both the raw material cost and waste water treatment cost.

In the present invention, using only one type of metal compound as the metal compound that constitutes the raw material, and causing a reaction with that metal compound, produces a metal oxide sol in which the particles are all made up of a single metal oxide. Also, using a plurality of metal compounds as the metal compounds that constitute the raw materials, and causing a reaction with those metal compounds, produces a metal oxide sol in which the particles are made up of composite metal oxides.

Using a single metal compound as the raw material produces a sol that contains only magnesium oxide (MgO), calcium oxide (CaO), barium oxide (BaO), zinc oxide (ZnO), nickel oxide (NiO), yttrium oxide (Y$_2$O$_3$), aluminum oxide (Al$_2$O$_3$), indium oxide (In$_2$O$_3$), iron oxide (Fe$_2$O$_3$), cobalt oxide (Co$_2$O$_3$), bismuth oxide (Bi$_2$O$_3$), titanium oxide (TiO$_2$), zirconium oxide (ZrO$_2$), silicon oxide (SiO$_2$), tin oxide (SnO$_2$), or cerium oxide (CeO$_2$), respectively. Regardless of the valence of the metal in the metal compound that is dissolved in the alkaline aqueous medium, in the end it is possible to form an aqueous sol of oxide particles with a stable valence. For example, a sol containing cerium oxide (CeO$_2$) particles is produced regardless of whether a compound of trivalent cerium or a compound of tetravalent cerium is used.

Also, an aqueous sol that contains particles of composite metal oxides can be produced by using a plurality of metal compounds as the metal compounds that constitute the raw materials, and causing a reaction with those metal compounds.

Mixing an yttrium compound and a zirconium compound, and causing them to react chemically, produces composite oxide particles of yttrium oxide and zirconium oxide (ZrO$_2$—

$Y_2O_3$). An aqueous sol that contains yttrium oxide stabilized zirconium oxide particles in which yttrium oxide and zirconium oxide are combined is produced by selecting the ratio of the mixture of the yttrium compound and the zirconium compound.

Mixing a calcium compound and a zirconium compound, and causing them to react chemically, produces composite oxide particles of calcium oxide and zirconium oxide ($ZrO_2$—CaO). An aqueous sol that contains calcium oxide stabilized zirconium oxide, in which calcium oxide and zirconium oxide are combined, is produced by selecting the ratio of the mixture of the calcium compound and the zirconium compound.

Mixing a cerium compound and a zirconium compound, and causing them to react chemically, produces composite oxide particles of cerium oxide and zirconium oxide ($ZrO_2$—$CeO_2$).

Mixing an aluminum compound and a zirconium compound, and causing them to react chemically, produces combined oxide particles of aluminum oxide and zirconium oxide ($ZrO_2$—$Al_2O_3$).

Mixing a tin compound and a zirconium compound, and causing them to react chemically, produces combined oxide particles of tin oxide and zirconium oxide ($ZrO_2$—$SnO_2$).

The alkaline metal oxide sols produced by the present invention exist stably for at least one month at 50° C.

The alkaline metal oxide sols produced by the present invention can, as desired, contain as an additive a water-soluble base (for example, a water-soluble inorganic salt such as sodium hydroxide, potassium hydroxide, lithium hydroxide, ammonia, or the like; an amine such as n-propyl amine, monoethanolamine, triethanolamine, or the like; or a water-soluble organic salt such as monomethyl-triethyl ammonium hydroxide, tetramethyl ammonium hydroxide, or the like).

The alkaline metal oxide sols produced by the present invention can, as desired, be made into acidic metal oxide sols by adding a water-soluble acid (for example, an inorganic acid such as hydrochloric acid, nitric acid, sulfuric acid, or the like; or an organic acid, such as formic acid, acetic acid, lactic acid, glycolic acid, citric acid, tartaric acid, sulfamic acid, or the like).

The viscosity of the alkaline metal oxide sols produced by the present invention can, as desired, be controlled (reduced) by adding one, or a combination of two or more, of the aforementioned water-soluble acids or water-soluble bases, which makes it possible to increase the concentration of the metal oxide sols.

The aqueous sol of the metal oxide can be made into an organic solvent sol by using the evaporative method to replace the water with an organic solvent. Examples of an organic solvent include lower alcohols such as methanol, ethanol, propanol, isopropanol, and the like. Such a sol, in which the lower alcohol serves as a dispersant, can further be converted into a sol in which a hydrophobic solvent, such as ethylene glycol, toluene, hexane, or the like, serves as a dispersant.

The alkaline metal oxide sols produced by the present invention can, as desired, be made into stable metal oxide sols of high concentration and low viscosity, with particles of low surface activity, by being dried at a temperature of approximately 100° C. until almost all of the water content is removed, then being further pulverized by a mixer or the like and baked at a temperature of 400° C. to 1200° C., after which the baked powder is dispersed in a dilute aqueous solution of a water-soluble acid or a water-soluble base and milled in a ball mill, a sand mill, or the like.

The alkaline metal oxide sols produced by the present invention can be used as coating agents or the like by mixing them with a silicon compound, an active energy ray cured polymer meta-acrylate, a resin emulsion, a water-soluble high-polymer liquid, a silicon oil, a paint, or the like.

The silicon compound may, for example, contain a constituent A and/or a constituent B, described below.

Constituent A: An organic silicon compound or a hydrolysate thereof, as described by the general formula below.

General Formula (I)

$(R^1)_a(R^3)_b Si(OR^2)_{4-(a+b)}$ (I)

wherein $R^1$ and $R^3$ represent organic groups selected from among the following: an alkyl group, an alkenyl group, an aryl group, an acyl group, a halogen group, a glycidoxy group, an epoxy group, an amino group, a phenyl group, a mercapto group, a methacryloxy group, a cyano group. $R^2$ represents an organic group having 1 to 8 carbon atoms and selected from among the following: an alkyl group, an alkoxy group, an acyl group, a phenyl group. a and b each represents the integer 0 or 1.

Constituent B: An organic silicon compound or a hydrolysate thereof, as described by the general formula below.

General Formula (II)

$\{(OX)_{3-a}Si(OR^4)\}Y$ (II)

wherein $R^4$ represents an organic group having 1 to 5 carbon atoms. X represents an alkyl group having 1 to 4 carbon atoms or an acyl group having 1 to 4 carbon atoms. Y represents an organic group having 2 to 20 carbon atoms. a represents the integer 0 or 1.

The constituent A is described by the general formula (I) above and is specifically an organic silicon compound or a hydrolysate thereof. Examples include the following: methyl silicate, ethyl silicate, n-propyl silicate, iso-propyl silicate, n-butyl silicate, tetra-acetoxysilane, methyl trimethoxysilane, methyl tripropoxysilane, methyl triacetoxysilane, methyl tributoxysilane, methyl tripropoxysilane, methyl tri-amyloxysilane, methyl triphenoxysilane, methyl tribenzyloxysilane, methyl triphenethyloxysilane, glucidoxymethyl trimethoxysilane, glycidoxymethyl trimethoxysilane, α-glycidoxyethyl trimethoxysilane, α-glycidoxy-triethoxysilane, β-glycidoxy-trimethoxysilane, β-glycidoxyethyl triethoxysilane, α-glycidoxypropyl triethoxysilane, α-glycidoxypropyl triethoxysilane, β-glycidoxypropyl trimethoxysilane, β-glycidoxypropyl triethoxysilane, γ-glycidoxypropyl trimethoxysilane, γ-glycidoxypropyl triethoxysilane, γ-glycidoxypropyl tripropoxysilane, γ-glycidoxypropyl tributoxysilane, γ-glycidoxypropyl triphenoxysilane, α-glycidoxybutyl trimethoxysilane, α-glycidoxybutyl triethoxysilane, β-glycidoxybutyl triethoxysilane, γ-glycidoxybutyl trimethoxysilane, γ-glycidoxybutyl triethoxysilane, δ-glycidoxybutyl trimethoxysilane, δ-glycidoxybutyl triethoxysilane, (3,4-epoxycyclohexyl)methyl trimethoxysilane, (3,4-epoxycyclohexyl)methyl triethoxysilane, β-(3,4-epoxycyclohexyl)ethyl trimethoxysilane, β-(3,4-epoxycyclohexyl)ethyl triethoxysilane, β-(3,4-epoxycyclohexyl)ethyl tripropoxysilane, β-(3,4-epoxycyclohexyl)ethyl tributoxysilane, β-(3,4-epoxycyclohexyl)ethyl triphenoxysilane, γ-(3,4-epoxycyclohexyl)propyl trimethoxysilane, γ-(3,4-epoxycyclohexyl)propyl triethoxysilane, δ-3,4-epoxycyclohexyl)butyl trimethoxysilane, δ-(3,4-epoxycyclohexyl)butyl triethoxysilane, glycidoxymethyl methyl dimethoxysilane, glycidoxymethyl methyl diethoxysilane, α-glycidoxyethyl methyl dimethoxysilane, α-glycidoxyethyl methyl diethoxysilane, β-glycidoxyethyl methyl dimethoxysilane, β-glycidoxyethyl ethyl dimethoxysilane, α-glycidoxypropyl methyl dimethoxysilane, α-glycidoxypropyl methyl diethoxysilane, β-glycidoxypropyl methyl dimethoxysilane, β-glycidoxypropyl ethyl dimethoxysilane, γ-glycidoxypropyl methyl dimethoxysilane, γ-glycidoxypropyl methyl diethoxysilane, γ-glycidoxypropyl methyl dipropoxysilane, γ-glycidoxypropyl methyl dibutoxysilane, γ-glycidoxypropyl methyl diphenoxysilane, γ-glycidoxypropyl ethyl diethoxysilane, γ-glycidoxypropyl ethyl diethoxysilane, γ-glycidoxypropyl vinyl methoxysilane, γ-glycidoxypropyl vinyl ethoxysilane, γ-glycidoxypropyl vinyl phenyl methoxysilane, γ-glycidoxypropyl vinyl phenyl ethoxysilane, ethyl trimethoxysilane, ethyl triethoxysilane, vinyl trimethoxysilane, vinyl triacetoxysilane, vinyl trimethoxyethoxysilane, phenyl trim ethoxysilane, phenyl triethoxysilane phenyl triacetoxysilane, γ-chloropropyl trimethoxysilane, γ-chloropropyl triethoxysilane, γ-chloropropyl triacetoxysilane, 3,3,3-trifluoropropyl trimethoxysilane, γ-methacryloxypropyl trimethoxysilane, γ-mercaptopropyl trimethoxysilane, β-mercaptopropyl triethoxysilane, β-cyanoethyl triethoxysilane, chloromethyl trimethoxysilane, chloromethyl triethoxysilane, N-(β-aminoethyl)γ-aminopropyl trimethoxysilane, N-(β-aminoethyl)γ-aminopropyl methyl dimethoxysilane, γ-aminopropyl methyl trimethoxysilane, N-(β-aminoethyl)γ-aminopropyl triethoxysilane, N-(β-aminoethyl)γ-aminopropyl methyl diethoxysilane, dimethyl dimethoxysilane, phenyl methyl dimethoxysilane, dimethyl diethoxysilane, phenyl methyl diethoxysilane, γ-chloropropyl methyl dimethoxysilane, γ-chloropropyl methyl diethoxysilane, dimethyl diacetoxysilane, γ-methacryloxypropyl methyl dimethoxysilane, γ-methacryloxypropyl methyl diethoxysilane, γ-mercaptopropyl methyl dimethoxysilane, γ-mercaptomethyl diethoxysilane, methyl vinyl dimethoxysilane, methyl vinyl diethoxysilane, and the like, as well as the hydrolysates thereof.

Next, the constituent B will be explained. The constituent B is described by the general formula (II) above and is specifically an organic silicon compound or a hydrolysate thereof. Examples include the following: methylene bis-methyl-dimethoxysilane, ethylene bis-ethyl-dimethoxysilane, propylene bis-ethyl-diethoxysilane, butylene bis-methyl-diethoxysilane, and the like, as well as the hydrolysates thereof.

The organic silicon compounds that serve as the constituent A and the constituent B can be used independently as only the constituent A or only the constituent B, or a mixture of the constituent A and the constituent B can be used. Naturally, it is also possible to use two or more types of the constituent A and to use two or more types of the constituent B.

The hydrolysis of the organic silicon compounds that serve as the constituent A and the constituent B is carried out by adding an acidic aqueous solution, such as an aqueous hydrochloric acid solution, an aqueous sulfuric acid solution, an aqueous acetic acid solution, or the like, to the organic silicon compounds that serve as the constituent A and the constituent B and mixing.

The active energy ray cured polymer meta-acrylate can be freely selected from among meta-acrylates whose molecules contain one or more meta-acryloyl groups and that can be hardened by ultraviolet rays or an electron beam. The meta-acrylates can be used singly or in combination. Specific examples of the meta-acrylate include the following: 2-hydroxyethyl meta-acrylate, 2-hydroxypropyl meta-acrylate, isobutyl meta-acrylate, t-butyl meta-acrylate, isobutyl meta-acrylate, 2-ethyl-hexyl meta-acrylate, stearyl acrylate, 2-ethyl-hexyl carbitol acrylate, ω-carboxy-polycaprolactone monoacrylate, acryloyloxy-ethyl acid, acrylic acid dimer, lauryl meta-acrylate, 2-methoxyethyl acrylate, butoxyethyl acrylate, ethoxy-ethoxyethyl acrylate, methoxy-ethylene glycol acrylate, methoxy-polyethylene glycol acrylate, stearyl meta-acrylate, cyclohexyl meta-acrylate, tetrahydrofurfuryl meta-acrylate, N-vinyl-2-pyrolidone, isobornyl meta-acrylate, dicyclopentenyl acrylate, benzyl acrylate, phenyl-glycidyl ether epoxy acrylate, phenoxy-ethyl meta-acrylate, phenoxy-polyethylene glycol acrylate, nonyl-phenol ethoxylated acrylate, acryloyloxy-ethyl phthalate, tribromo-phenyl acrylate, tribromo-phenol ethoxylated meta-acrylate, methyl meta-acrylate, tribromo-phenyl meta-acrylate, methacryloyl-oxyethyl acid, methacryloyl-oxyethyl maleate, methacryloyl-oxyethyl phthalate, polyethylene glycol meta-acrylate, polypropylene glycol meta-acrylate, β-carboxyethyl acrylate, N-methylol acrylamide, N-methoxymethyl acrylamide, N-ethoxymethyl acrylamide, N-n-butoxymethyl acrylamide, t-butyl-acrylamide sulfonate, vinyl stearylate, N-methyl acrylamide, N-dimethyl acrylamide, N-dimethyl-amino-ethyl meta-acrylate, N-dimethyl-amino-propyl acrylamide, acryloyl morpholine, glycidyl meta-acrylate, n-butyl meta-acrylate, ethyl meta-acrylate, allyl meta-acrylate, cetyl meta-acrylate, pentadyl meta-acrylate, methoxy-polyethylene glycol meta-acrylate, diethyl-amino-ethyl meta-acrylate, methacryloxy-ethyl succinate, hexanediol diacrylate, neopentyl glycol diacrylate, triethylene glycol diacrylate, polyethylene glycol diacrylate, polypropylene glycol diacrylate, neopentyl hydroxypivalic acid ester, pentaerythritol diacrylate monostearate, glycol diacrylate, 2-hydroxyethyl meta-acryloyl phosphate, bisphenol-A ethylene glycol-added acrylate, bis-phenol-F ethylene glycol-added acrylate, tricyclodecane methanol diacrylate, tris-hydroxyethyl isocyanurate diacrylate, 2-hydroxy-1-acryloxy-3-methacryloxy-propane, trimethylol propane triacrylate, trimethylol propane ethylene glycol-added triacrylate, trimethylol propane propylene glycol-added triacrylate, penta-erythritol triacrylate, tris-acryloyloxy-ethyl phosphate, tris-hydroxyethyl isocyanurate triacrylate, denatured ε-caprolactone triacrylate, trimethylol propane ethoxy-triacrylate, glycerin propylene glycol-added triacrylate, penta-erythritol tetra-acrylate, penta-erythritol ethylene glycol-added tetra-acrylate, di-trimethylol propane tetra-acrylate, di-penta-erythritol hexa-acrylate, di-penta-erythritol monohydroxy-penta-acrylate, urethane acrylate, epoxy acrylate, polyester acrylate, unsaturated polyester, and the like. The choice of the meta-acrylate is not limited to these examples. These meta-acrylates can be used singly or in combination, as desired, but a poly-functional meta-acrylate monomer or oligomer whose molecule preferably contains two or more meta-acryloyl groups is ideal, because after polymerization, its surface film is hard and has good abrasion resistance.

EXAMPLES

Example 1

Figure 1:
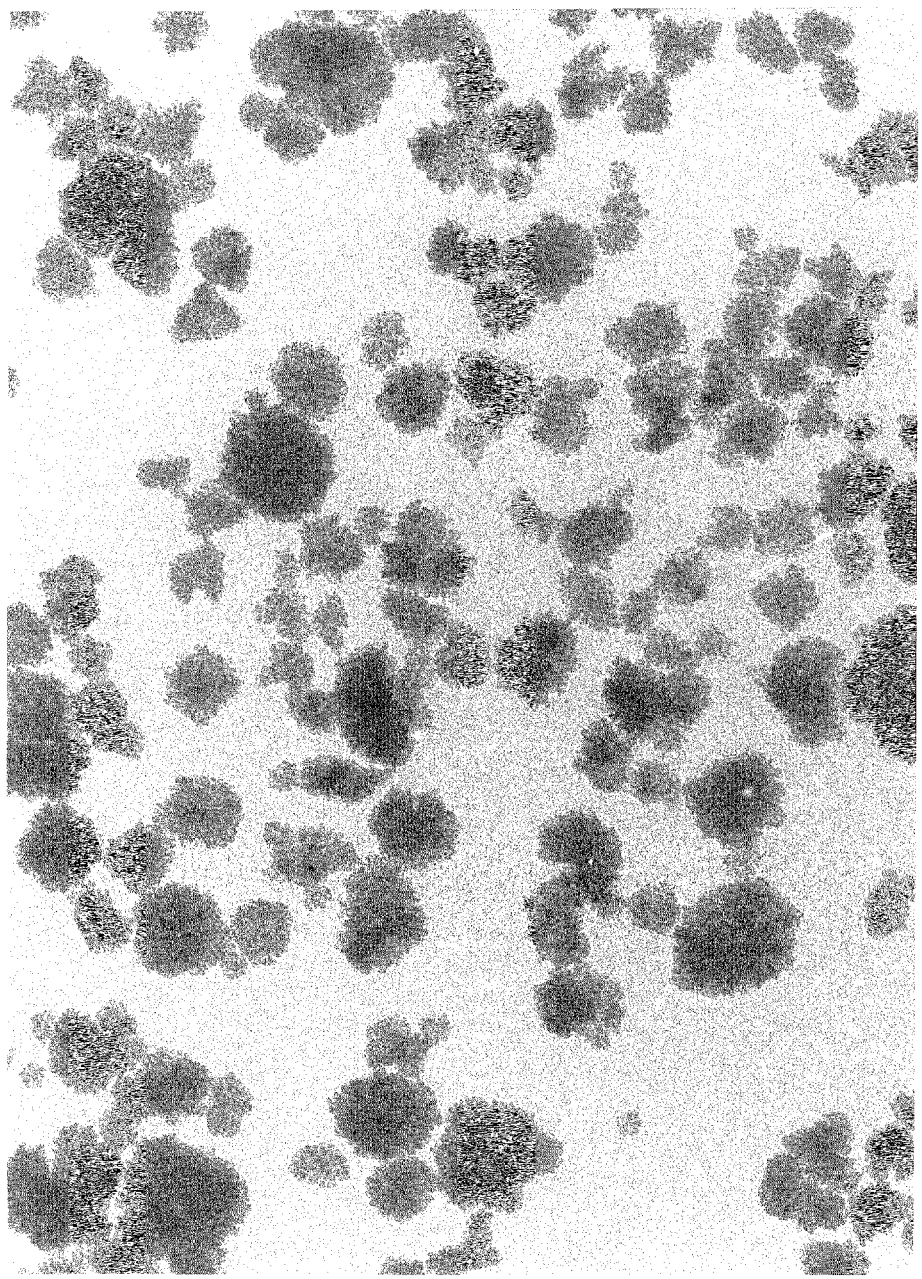
FIG. 1 is an electron photomicrograph showing a particle structure of a zirconia sol produced in Example 1. The magnification is 200,000 times.
Figure 11:
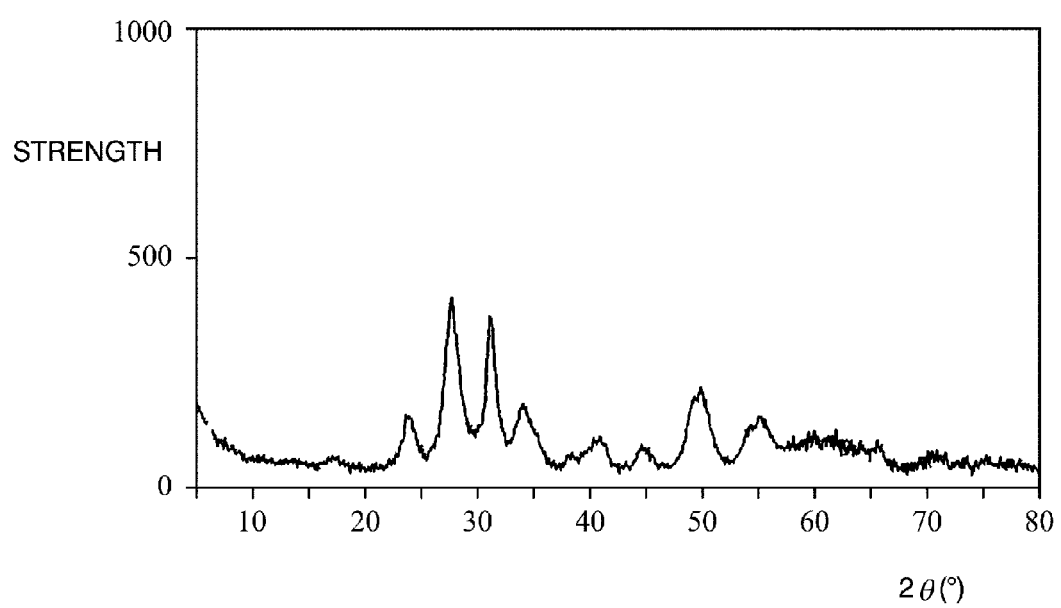
FIG. 11 shows an X-ray diffraction pattern for a powder formed by drying at 110° C. the zirconia sol produced in Example 1.

In a 3-liter glass vessel, a dilute aqueous solution was formed by mixing 950 g of an aqueous solution of tetramethyl ammonium hydrogen carbonate (44.5 mass percent as converted to tetramethyl ammonium hydroxide; made by Tama Chemicals Co., Ltd.) and 950 g of pure water. The aqueous solution was stirred as it was heated to 95° C., then zirconium oxycarbonate powder ($ZrOCO_3$, containing 42.1 mass percent $ZrO_2$; made by Daiichi Kigenso Kagaku Kogyo Co., Ltd.) was slowly added to the aqueous solution, until a total of 585.2 g had been added. After the addition of zirconium oxycarbonate powder was complete, heat aging was continued, with pure water being added as necessary to adjust the concentration, until the solution was aged for 3 hours at 95° C. At the point when the aging was complete, the liquid mixture was in a slurry state, containing 9.9 mass percent $ZrO_2$, with a pH of 9.5. The slurry was transferred to a stainless steel autoclave vessel, where a hydrothermal synthesis reaction was carried out for 3 hours at 140° C. while the slurry was stirred. The substance produced by this reaction had been completely converted into a sol, with no undissolved matter at all, containing 9.9 mass percent $ZrO_2$, with a pH of 8.8. Next, an ultrafiltration device was used to clean and concentrate the sol as pure water was slowly added, producing 453 g of highly concentrated zirconia sol with a $ZrO_2$ concentration of 48.9 mass percent. The sol thus produced had a specific gravity of 1.722, a pH of 8,8, a viscosity of 5.5 mPa·s, a tetramethyl ammonium hydroxide concentration of 1.2 mass percent (measured by titration), and a particle size of 82 nm, as measured by the dynamic light scattering method. In the dynamic light scattering method, when particles are aggregated, the mean particle size of the aggregated particles is measured. When the particles were checked using a transmission electron microscope, nearly all of the primary particles with a size of around 10 nm had aggregated or combined into aggregated particles, with the size of a single aggregated particle ranging from 30 nm to 200 nm. FIG. 1 is an electron photomicrograph of the sol (magnified 200,000 times). FIG. 11 shows an X-ray diffraction pattern for a powder formed by drying the sol at 110° C. The particles were in monoclinic form. Also, the zirconia sol was stable for at least one month at 50° C., without any sedimentation.

Example 2

In a 3-liter glass vessel, a dilute aqueous solution was formed by mixing 1227 g of an aqueous solution of tetramethyl ammonium hydrogen carbonate (44.5 mass percent as converted to tetramethyl ammonium hydroxide; made by Tama Chemicals Co., Ltd.) and 673 g of pure water. The aqueous solution was stirred as it was heated to 95° C., then zirconium oxycarbonate powder ($ZrOCO_3$, containing 42.1 mass percent $ZrO_2$; made by Daiichi Kigenso Kagaku Kogyo Co., Ltd.) was slowly added to the aqueous solution, until a total of 585.2 g had been added. After the addition of zirconium oxycarbonate powder was complete, heat aging was continued, with pure water being added as necessary to adjust the concentration, until the solution was aged for 3 hours at 95° C. At the point when the aging was complete, the liquid mixture was in a slurry state, containing 9.9 mass percent $ZrO_2$, with a pH of 9.8. The slurry was transferred to a stainless steel autoclave vessel, where a hydrothermal synthesis reaction was carried out for 3 hours at 140° C. while the slurry was stirred. The substance produced by this reaction had been completely converted into a sol, with no undissolved matter at all, containing 9.9 mass percent $ZrO_2$, with a pH of 9.1. Next, an ultrafiltration device was used to clean and concentrate the sol as pure water was slowly added, producing 535 g of highly concentrated zirconia sol with a $ZrO_2$ concentration of 48.9 mass percent. The sol thus produced had a specific gravity of 1.532, a pH of 8.8, a viscosity of 3.9 mPa·s, a tetramethyl ammonium hydroxide concentration of 1.0 mass percent (measured by titration), and a particle size of 70 nm, as measured by the dynamic light scattering method. In the dynamic light scattering method, when particles are aggregated, the mean particle size of the aggregated particles is measured. When the particles were checked using a transmission electron microscope, nearly all primary particles with a size of around 10 nm had aggregated or combined into aggregated particles, with the size of a single aggregated particle ranging from 20 nm to 150 nm. Also, the zirconia sol was stable for at least one month at 50° C., without any sedimentation.

Example 3

In a 3-liter glass vessel, a dilute aqueous solution was formed by mixing 1306.1 g of an aqueous solution of tetramethyl ammonium hydrogen carbonate (44.5 mass percent as converted to tetramethyl ammonium hydroxide; made by Tama Chemicals Co., Ltd.) and 592.2 g of pure water. The aqueous solution was stirred as it was heated to 95° C., then zirconium oxycarbonate powder ($ZrOCO_3$, containing 42.1 mass percent $ZrO_2$; made by Daiichi Kigenso Kagaku Kogyo Co., Ltd.) was slowly added to the aqueous solution, until a total of 801.7 g had been added. After the addition of zirconium oxycarbonate powder was complete, the solution was further heated to 105° C., after which the solution was aged for 6 hours at 105° C., with pure water being added as necessary to adjust the concentration. At the point when the aging was complete, the liquid mixture vas in a slurry state, containing 12.5 mass percent $ZrO_2$, with a pH of 10.6. The slurry was transferred to a stainless steel autoclave vessel, where a hydrothermal synthesis reaction was carried out for 3 hours at 140° C. while the slurry was stirred. The substance produced by this reaction had been completely converted into a sol, with no undissolved matter at all, containing 12.5 mass percent $ZrO_2$, with a pH of 9.8. Next, an ultrafiltration device was used to clean and concentrate the sol as pure water was slowly added, producing 748 g of highly concentrated zirconia sol with a $ZrO_2$ concentration of 40.6 mass percent. The sol thus produced had a specific gravity of 1.540, a pH of 8.9, a viscosity of 4.1 mPa·s, a tetramethyl ammonium hydroxide concentration of 1.0 mass percent (measured by titration), and a particle size of 77 nm, as measured by the dynamic light scattering method. In the dynamic light scattering method, when particles are aggregated, the mean particle size of the aggregated particles is measured. When the particles were checked using a transmission electron microscope, nearly all primary particles with a size of around 10 nm had aggregated or combined into aggregated particles, with the size of a single aggregated particle ranging from 20 nm to 150 nm.

Also, the zirconia sol was stable for at least one month at 50° C., without any sedimentation.

Example 4 in a 5-liter glass vessel, a mixed aqueous solution was formed by mixing 2546.4 g of the filtrate discharged in the process of washing and concentrating the sol using the ultrafiltration device in Example 3 and 196.0 g of an aqueous solution of tetramethyl ammonium hydrogen carbonate (44.5 mass percent as converted to tetramethyl ammonium hydroxide; made by Tama Chemicals Co., Ltd.). In the resulting liquid mixture, the ratio of the tetramethyl ammonium hydrogen carbonate in the filtrate to the newly added tetramethyl ammonium hydrogen carbonate was 85:15. (Note that this value is the mass ratio as converted to tetramethyl ammonium hydroxide.) The aqueous solution was stirred as it was heated to 95° C., then zirconium oxycarbonate powder ($ZrOCO_3$, containing 42.1 mass percent $ZrO_2$; made by Daiichi Kigenso Kagaku Kogyo Co., Ltd.) was slowly added to the aqueous solution, until a total of 771.5 g had been added. After the addition of zirconium oxycarbonate powder was complete, the solution was further heated to 105° C., after which the solution was aged for 6 hours at 105° C., with pure water being added as necessary to adjust the concentration. At the point when the aging was complete, the liquid mixture was in a slurry state, containing 12.5 mass percent $ZrO_2$, with a pH of 10.7. The slurry was transferred to a stainless steel autoclave vessel, where a hydrothermal synthesis reaction was carried out for 3 hours at 140° C. while the slurry was stirred. The substance produced by this reaction had been completely converted into a sol, with no undissolved matter at all, containing 12.5 mass percent $ZrO_2$, with a pH of 10.0. Next, an ultrafiltration device was used to clean and concentrate the sol as pure water was slowly added, producing 732 g of highly concentrated zirconia sol with a $ZrO_2$ concentration of 40.6 mass percent. The sol thus produced had a specific gravity of 1.540, a pH of 9.0, a viscosity of 4.2 mPa·s, a tetramethyl ammonium hydroxide concentration of 1.0 mass percent (measured by titration), and a particle size of 91 nm, as measured by the dynamic light scattering method. In the dynamic light scattering method, when particles are aggregated, the mean particle size of the aggregated particles is measured. When the particles were checked using a transmission electron microscope, nearly all primary particles with a size of around 10 nm had aggregated or combined into aggregated particles, with the size of a single aggregated particle ranging from 20 nm to 200 nm. Also, the zirconia sol was stable for at least one month at 50° C., without any sedimentation. The physical properties and stability of the sol were almost the same as those of the sol produced in Example 3.

Example 5

Figure 2:
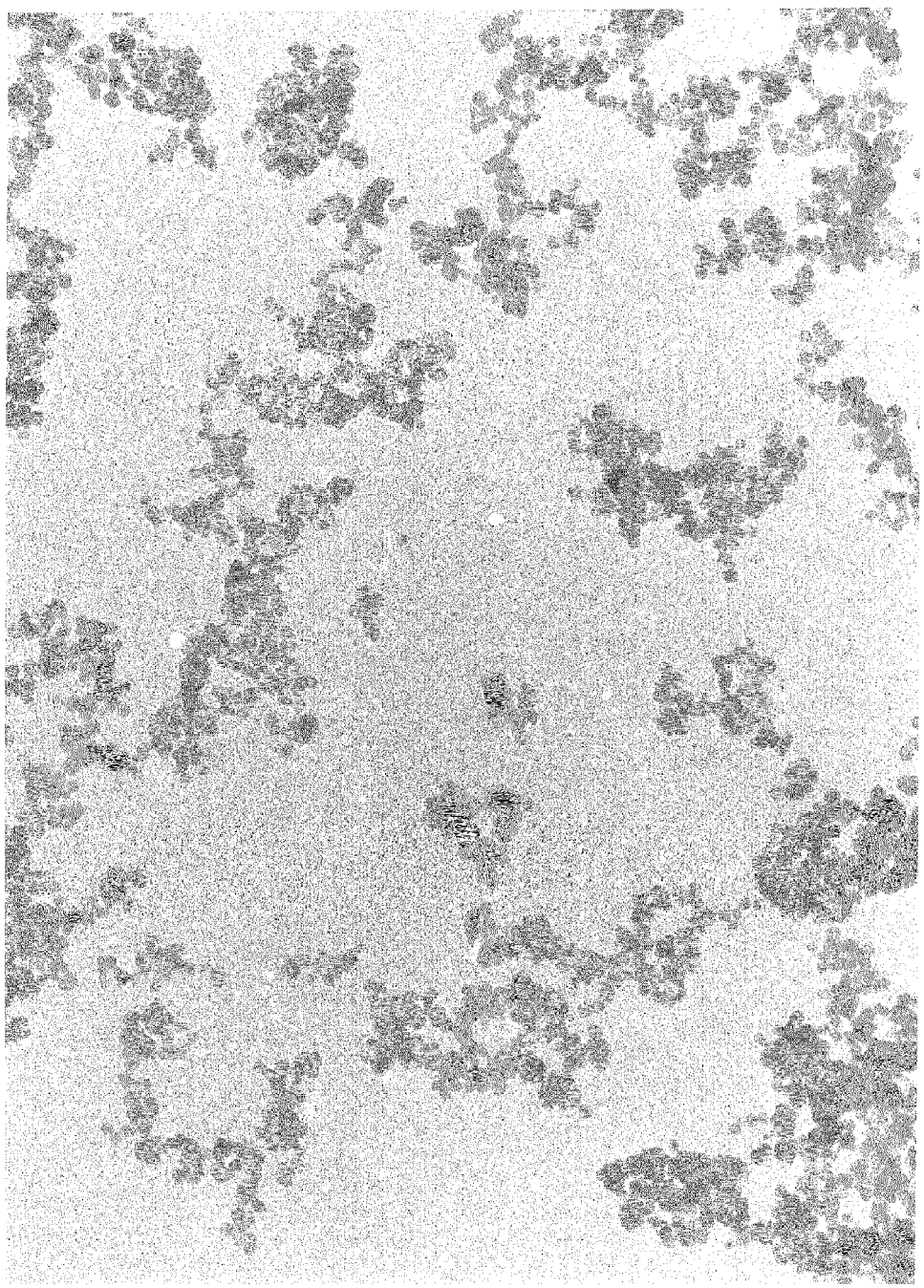
FIG. 2 is an electron photomicrograph showing a particle structure of a cerium oxide sol produced in Example 5. The magnification is 200,000 times.

In a 3-liter glass vessel, a dilute aqueous solution was formed by mixing 713.0 g of an aqueous solution of tetramethyl ammonium hydrogen carbonate (44.5 mass percent as converted to tetramethyl ammonium hydroxide; made by Tama Chemicals Co., Ltd.) and 1983.1 g of pure water. The aqueous solution was stirred as it was heated to 50° C., then cerium carbonate powder ($Ce_2(CO_3)_3$, containing 50.8 mass percent $CeO_2$; made by AMR Technologies, Inc.) was slowly added to the aqueous solution, until a total of 236.2 g had been added. After the addition of cerium carbonate powder was complete, an aqueous solution containing 67.7 g of hydrogen peroxide (35 mass percent) was added, and the solution was stirred for 1 hour. Next, the solution was further heated to 105° C., after which the solution was aged for 6 hours at 105° C., with pure water being added as necessary to adjust the concentration. At the point when the aging was complete, the liquid mixture was in a slurry state, containing 4.0 mass percent $CeO_2$, with a pH of 10.2. The slurry was transferred to a stainless steel autoclave vessel, where a hydrothermal synthesis reaction was carried out for 3 hours at 150° C. while the slurry was stirred. Small amounts of undissolved matter and wet gel sediment were observed in the substance produced by this reaction, but the remaining portion had been completely converted into a sol, containing 3.9 mass percent $CeO_2$, with a pH of 10.2. Next, the sol was left undisturbed to let the undissolved matter and wet gel sediment settle, after which the undissolved matter and wet gel sediment were removed. Next, an ultrafiltration device was used to clean and concentrate the sol as pure water was slowly added, producing 202 g of highly concentrated ceria sol with a $CeO_2$ concentration of 41.5 mass percent. The sol thus produced had a specific gravity of 1.566, a pH of 9.0, a viscosity of 128 mPa·s, a tetramethyl ammonium hydroxide concentration of 0.8 mass percent (measured by titration), and a particle size of 237 nm, as measured by the dynamic light scattering method. In the dynamic light scattering method, when particles are aggregated, the mean particle size of the aggregated particles is measured. When the particles were checked using a transmission electron microscope, primary particles with a size of around 10 nm had connected in various directions and aggregated, with the lengths of aggregated particles ranging from 20 nm to 500 nm. FIG. 2 is an electron photomicrograph of the sol (magnified 200,000 times). Also, the ceria sol was stable for at least one month at 50° C., without any sedimentation.

Example 6

Figure 3:
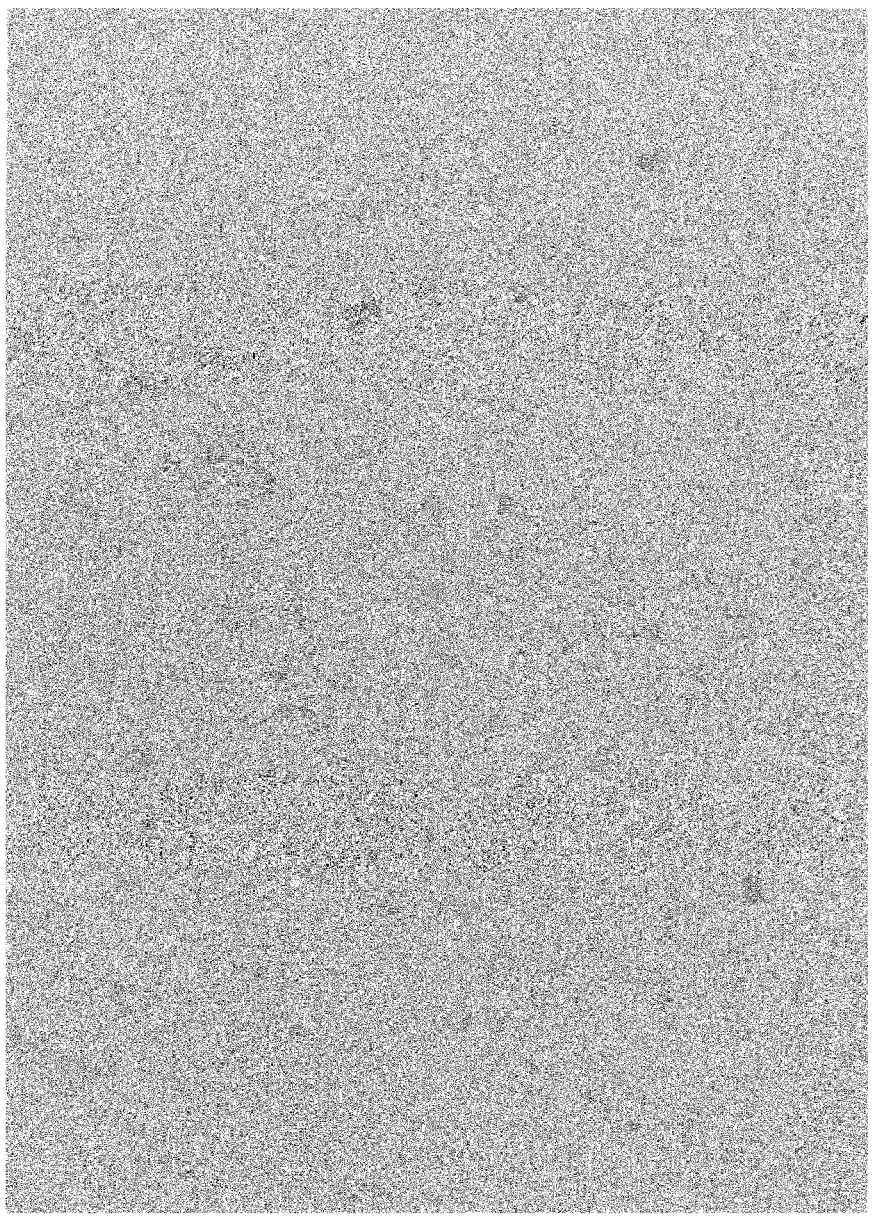
FIG. 3 is an electron photomicrograph showing a particle structure of a tin oxide sol produced in Example 6. The magnification is 200,000 times.

In a 3-liter glass vessel, a dilute aqueous solution was formed by mixing 325.7 g of an aqueous solution of tetramethyl ammonium hydrogen carbonate (44.5 mass percent as converted to tetramethyl ammonium hydroxide; made by Tama Chemicals Co., Ltd.) and 1795.2 g of pure water. As the aqueous solution was stirred, metastannic acid powder (containing 86.0 mass percent $SnO_2$) was slowly added to the aqueous solution, until a total of 279.1 g had been added. After the addition of metastannic oxide powder was complete, the aqueous solution was further heated to 105° C., after which the solution was aged for 6 hours at 105° C., with pure water being added as necessary to adjust the concentration. At the point when the aging was complete, the liquid mixture was in a slurry state, containing 10.0 mass percent $SnO_2$, with a pH of 10.2. The slurry was transferred to a stainless steel autoclave vessel, where a hydrothermal synthesis reaction was carried out for 3 hours at 145° C. while the slurry was stirred. The substance produced by this reaction had been completely converted into a sol, with no undissolved matter at all, containing 10.0 mass percent $SnO_2$, with a pH of 10.4. Next, an ultrafiltration device was used to clean and concentrate the sol as pure water was slowly added, producing 406 g of highly concentrated tin oxide sol with a $SnO_2$ concentration of 42.2 mass percent. The sol thus produced had a specific gravity of 1.580, a pH of 9.5, a viscosity of 11.3 mPa·s, a tetramethyl ammonium hydroxide concentration of 1.2 mass percent (measured by titration), and a particle size of 157 nm, as measured by the dynamic light scattering method. In the dynamic light scattering method, when particles are aggregated, the mean particle size of the aggregated particles is measured. When the particles were checked using a transmission electron microscope, primary particles with a size of 5 nm to 50 nm were present, both us single particles and as several connected particles, with the lengths of connected, aggregated particles ranging from 20 nm to 300 nm. FIG. 3 is an electron photomicrograph of the sol (magnified 200,000 times). Also, the tin oxide sol was stable for at least one month at 50° C., without any sedimentation.

Example 7

Figure 4:
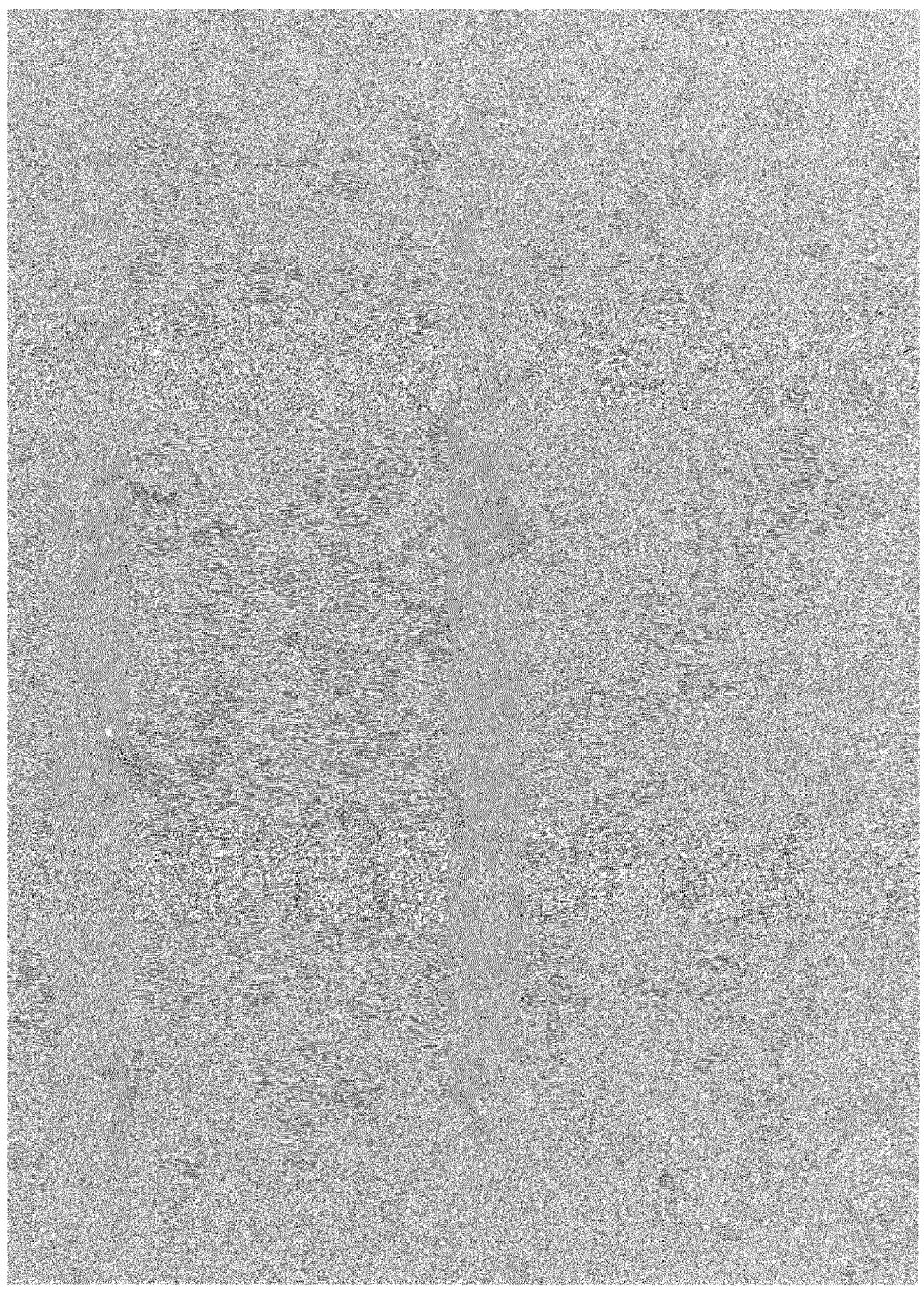
FIG. 4 is an electron photomicrograph showing a particle structure of an alumina sol produced in Example 7. The magnification is 200,000 times.

In a 3-liter glass vessel, a dilute aqueous solution was formed by mixing 1807.2 g of an aqueous solution of tetramethyl ammonium hydrogen carbonate (44.5 mass percent as converted to tetramethyl ammonium hydroxide; made by Tama Chemicals Co., Ltd.) and 1029.3 g of pure water. The aqueous solution was stirred as it was heated to 80° C., then dry aluminum hydroxide powder $(Al(OH)_3$, containing 55.1 mass percent $Al_2O_3$; made by Kyowa Chemical Industry Co., Ltd.) was slowly added to the aqueous solution, until a total of 163.5 g had been added. After the addition of dry aluminum hydroxide powder was complete, the solution was further heated to 105° C., after which the solution was aged for 6 hours at 105° C., with pure water being added as necessary to adjust the concentration. At the point when the aging was complete, the liquid mixture was in a slurry state, containing 3.0 mass percent $Al_2O_3$, with a pH of 11.5. The slurry was transferred to a stainless steel autoclave vessel, where a hydrothermal synthesis reaction was carried out for 8 hours at 150° C. while the slurry was stirred. Small amounts of undissolved matter and wet gel sediment were observed in the substance produced by this reaction, but the remaining portion was of a colloidal nature and contained 2.8 mass percent $Al_2O_3$, with a pH of 11.1. Next, the sol was left undisturbed to let the undissolved matter and wet gel sediment settle, after which the undissolved matter and wet gel sediment were removed. Next, an ultrafiltration device was used to clean the sol as pure water was slowly added, producing 2100.0 g of alumina sol with a $Al_2O_3$ concentration of 3.0 mass percent. The sol thus produced had a pH of 9.3, a viscosity of 290 mPa·s, a tetramethyl ammonium hydroxide concentration of 0.2 mass percent (measured by titration), and a particle size of 450 nm, as measured by the dynamic light scattering method. Particle aggregation occurred as a result of the washing, so despite the comparatively low concentration of $Al_2O_3$, the density was comparatively high, and the particle size measured by the dynamic light scattering method increased. For the purpose of shearing the aggregation of the sol, 25.0 g of nitric acid (10 mass percent) was slowly added as 2100.0 g of the sol was strongly agitated in a disperser, after which the sol was agitated for 1 hour. The resultant sol was acidic, with a pH of 3.8. The sol was then vacuum concentrated using a rotary evaporator, producing 788 g of alumina sol with an $Al_2O_3$, concentration of 8.0 mass percent. The sol thus produced had a specific gravity of 1.065, a pH of 4.3, a viscosity of 11.4 mPa·s, a $NO_3$ concentration of 0.3 mass percent, and a particle size of 266 nm, as measured by the dynamic light scattering method. In the dynamic light scattering method, when particles are aggregated, the mean particle size of the aggregated particles is measured. When the particles were checked using a transmission electron microscope, primary particles with a size of 5 nm to 50 nm were present, both as single particles and as several connected particles, with the lengths of connected, aggregated particles ranging from 20 nm to 300 nm. FIG. 4 is an electron photomicrograph of the sol (magnified 200,000 times). Also, the alumina sol was stable for at least one month at 50° C., without any sedimentation.

Example 8

In a 3-liter glass vessel, a dilute aqueous solution was formed by mixing 1126.5 g of an aqueous solution of tetramethyl ammonium hydrogen carbonate (44.5 mass percent as converted to tetramethyl ammonium hydroxide; made by Tama Chemicals Co., Ltd.) and 852.8 g of pure water. As the aqueous solution was stirred, zirconium oxycarbonate powder ($ZrOCO_3$, containing 42.1 mass percent $ZrO_2$; made by Daiichi Kigenso Kagaku Kogyo Co., Ltd.) was slowly added to the aqueous solution, until a total of 786.4 g had been added. After the addition of zirconium oxycarbonate powder was complete, yttrium carbonate trihydrate (54.9 mass percent $Y_2O_3$; made by Kanto Chemical Co., Inc.) was slowly added to the aqueous solution, until a total of 34.3 g had been added.

Figure 5:
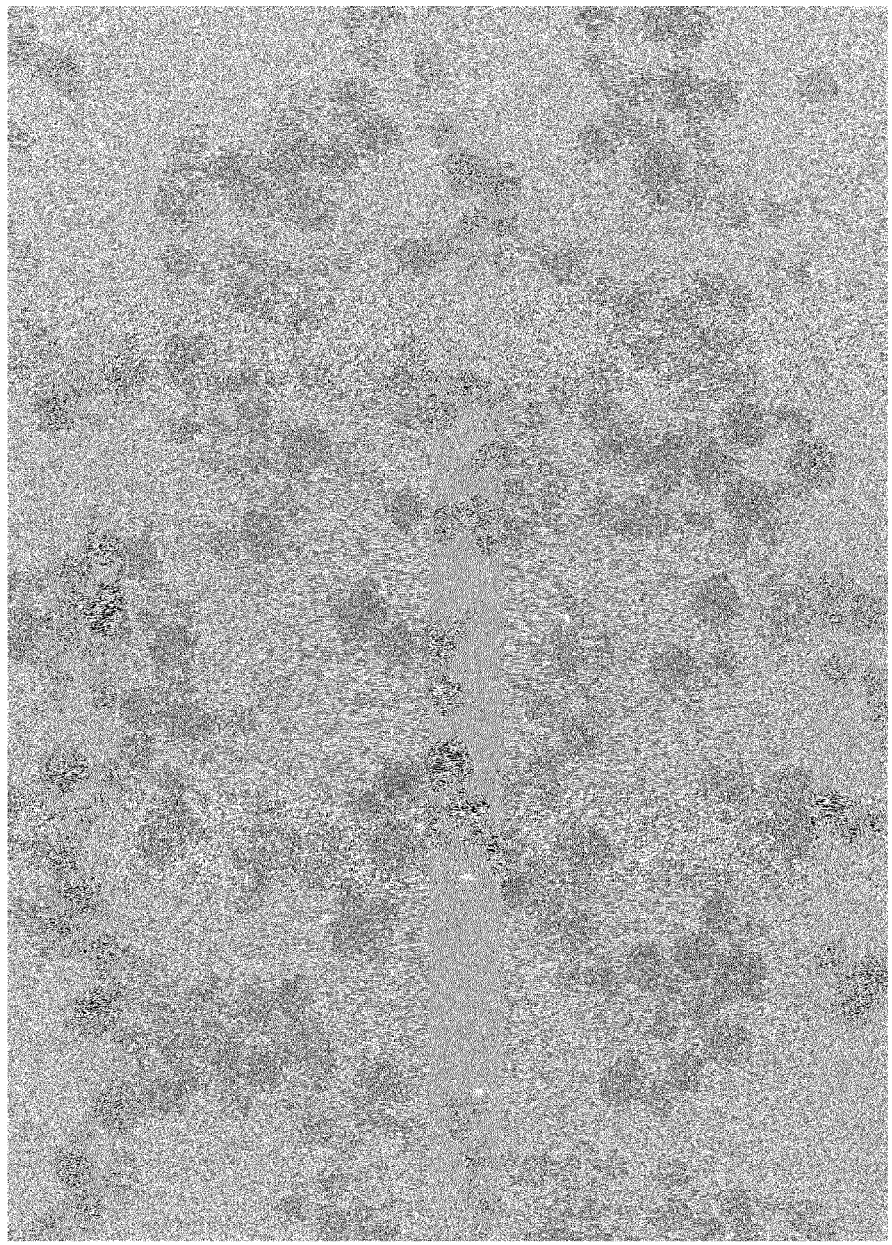
FIG. 5 is an electron photomicrograph showing a particle structure of a complex sol of yttrium oxide-zirconium oxide produced in Example 8. The magnification is 200,000 times.
Figure 12:
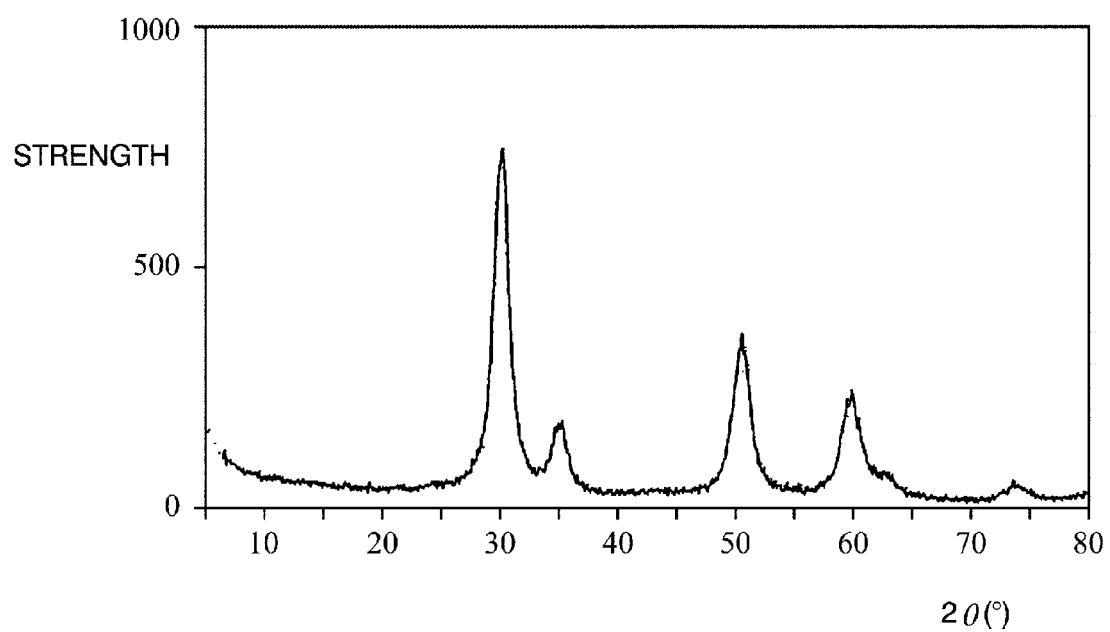
FIG. 12 shows an X-ray diffraction pattern for a powder formed by drying at 110° C. the complex sol of yttrium oxide-zirconium oxide produced in Example 8.

The $Y_2O_3$ content of the liquid mixture was 3 mole percent as $Y_2O_3/(ZrO_2+Y_2O_3)$, and the pH was 9.5. The liquid mixture was stirred as it was heated to 105° C., after which the mixture was aged for 6 hours at 105° C., with pure water being added as necessary to adjust the concentration. At the point when the aging was complete, the liquid mixture was in a slurry state, with a $(ZrO_2+Y_2O_3)$ concentration of 12.5 mass percent and a pH of 10.7. The slurry was transferred to a stainless steel autoclave vessel, where a hydrothermal synthesis reaction was carried out for 3 hours at 140° C. while the slurry was stirred. The substance produced by this reaction had been completely converted into a sol, with no undissolved matter at all, with a $(ZrO_2+Y_2O_3)$ concentration of 12.5 mass percent and a pH of 9.7. Next, an ultrafiltration device was used to clean and concentrate the sol as pure water was slowly added, producing 778 g of highly concentrated combined yttrium oxide and zirconium oxide sol with a $(ZrO_2+Y_2O_3)$ concentration of 40.5 mass percent. The sol thus produced had a specific gravity of 1.534, a pH of 8.7, a viscosity of 16.0 mPa·s, a tetramethyl ammonium hydroxide concentration of 0.9 mass percent (measured by titration), and a particle size of 69 nm, as measured by the dynamic light scattering method. In the dynamic light scattering method, when particles are aggregated, the mean particle size of the aggregated particles is measured. When the particles were checked using a transmission electron microscope, nearly all primary particles with a size of around 10 nm had aggregated or combined into aggregated particles, with the size of a single aggregated particle ranging from 10 nm to 100 nm. FIG. 5 is an electron photomicrograph of the sol (magnified 200,000 times). Also, 2 g of sulfuric acid and 5 g of water were added to 1 g of the sol, heated, and dissolved, after which a dilute solution was formed by dilution with water. When the content of $ZrO_2$ and $Y_2O_3$ in the dilute solution was measured by the ICP emission spectrometry, the $Y_2O_3$ content of the liquid mixture was 3.5 mole percent as $Y_2O_3/(ZrO_2+Y_2O_3)$. When X-ray diffraction was used to study the crystalline form of the dried sol, the peaks were mainly for tetragonal crystals and cubical crystals, and almost no monoclinic crystal peaks were observed. FIG. 12 shows an X-ray diffraction pattern for a powder formed by drying the sol at 110° C. Also, the sol was stable for at least one month at 50° C., without any sedimentation.

Example 9

Figure 6:
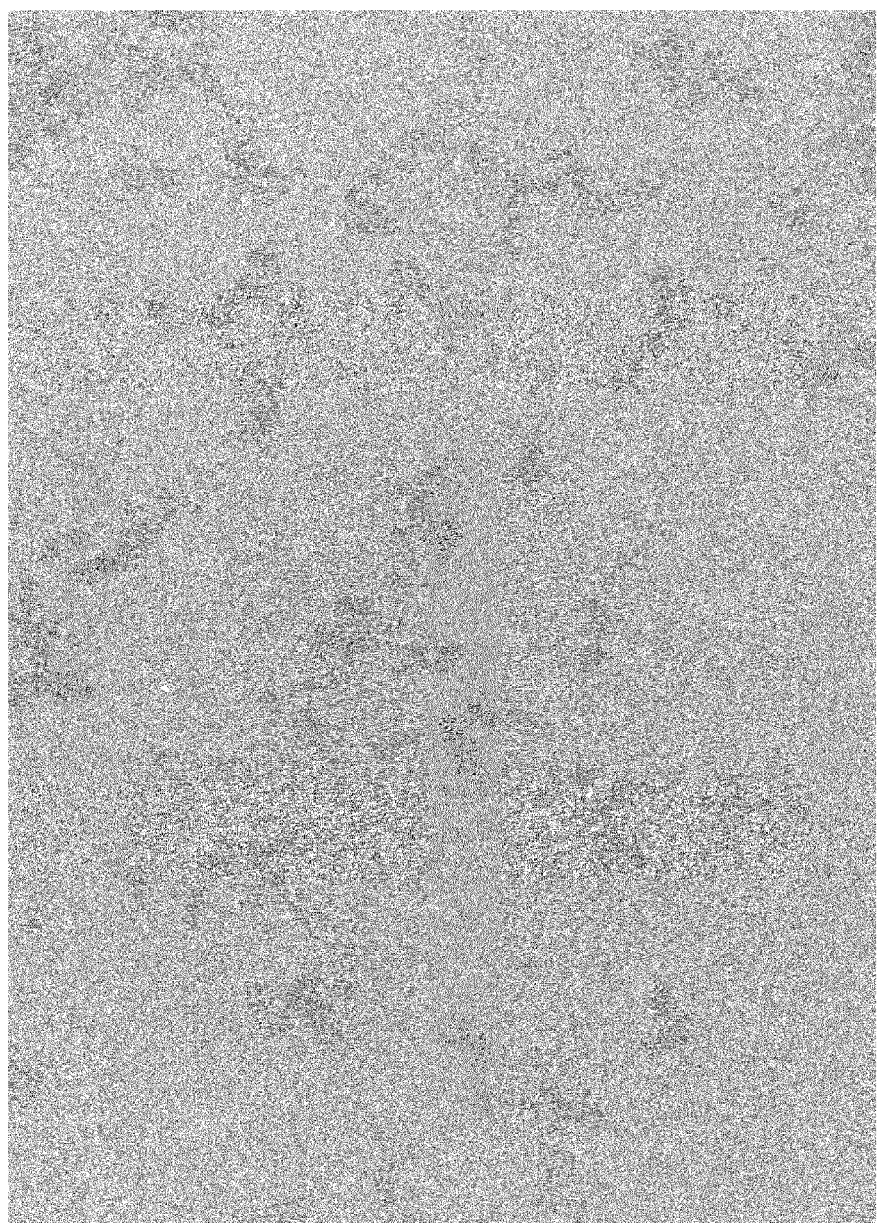
FIG. 6 is an electron photomicrograph showing a particle structure of a complex sol of yttrium oxide-zirconium oxide produced in Example 9. The magnification is 200,000 times.

In a 3-liter glass vessel, a dilute aqueous solution was formed by mixing 1472.4 g of an aqueous solution of tetramethyl ammonium hydrogen carbonate (44.5 mass percent as converted to tetramethyl ammonium hydroxide; made by Tama Chemicals Co., Ltd.) and 1180.1 g of pure water. As the aqueous solution was stirred, zirconium oxycarbonate powder ($ZrOCO_3$, containing 42.1 mass percent $ZrO_2$; made by Daiichi Kigenso Kagaku Kogyo Co., Ltd.) was slowly added to the aqueous solution, until a total of 473.2 g had been added. After the addition of zirconium oxycarbonate powder was complete, yttrium carbonate trihydrate (54.9 mass percent $Y_2O_3$; made by Kanto Chemical Co., Inc.) was slowly added to the aqueous solution, until a total of 74.3 g had been added. The $Y_2O_3$ content of the liquid mixture was 10 mole percent as $Y_2O_3/(ZrO_2+Y_2O_3)$, and the pH was 10.0. The liquid mixture was stirred as it was heated to 105° C., after which the mixture was aged for 6 hours at 105° C., with pure water being added as necessary to adjust the concentration. At the point when the aging was complete, the liquid mixture was in a slurry state, with a $(ZrO_2+Y_2O_3)$ concentration of 7.5 mass percent and a pH of 10.6. The slurry was transferred to a stainless steel autoclave vessel, where a hydrothermal synthesis reaction was carried out for 8 hours at 150° C. while the slurry was stirred. The substance produced by this reaction had been completely converted into a sol, with no undissolved matter at all, with a $(ZrO_2+Y_2O_3)$ concentration of 7.5 mass percent and a pH of 10.3. Next, an ultrafiltration device was used to clean and concentrate the sol as pure water was slowly added, producing 768 g, of highly concentrated composite sol of yttrium oxide-zirconium oxide with a $(ZrO_2+Y_2O_3)$ concentration of 25.0 mass percent. The sol thus produced had a specific gravity of 1.276, a pH of 9.1, a viscosity of 66.7 mPa·s, a tetramethyl ammonium hydroxide concentration of 0.5 mass percent (measured by titration), and a particle size of 86 nm, as measured by the dynamic light scattering method. In the dynamic light scattering method, when particles are aggregated, the mean particle size of the aggregated particles is measured. When the particles were checked using a transmission electron microscope, nearly all primary particles with a size of around 10 nm had aggregated or combined into aggregated particles, with the size of a single aggregated particle ranging from 3 nm to 50 nm. FIG. 6 is an electron photomicrograph of the sol (magnified 200,000 times). Also, 2 g of sulfuric acid and 5 g of water were added to 1 g of the sol, heated, and dissolved, after which a dilute solution was formed by dilution with water. When the content of ZrO, and $Y_2O_3$ in the dilute solution was measured by the ICP emission spectrometry, the $Y_2O_3$ content of the liquid mixture was 14.1 mole percent as $Y_2O_3/(ZrO_2+Y_2O_3)$. When X-ray diffraction was used to study the crystalline form of the dried sol, the peaks were mainly for tetragonal crystals and cubical crystals, and almost no monoclinic crystal peaks were observed. Also, the sol was stable for at least one month at 50° C., without any sedimentation.

Also, 2.2 g of an aqueous solution of 70 mass percent glycolic acid was added to 300 g of the sol as the sol was stirred, followed by the addition of 14.1 g of an aqueous solution of 25 mass percent tetramethyl ammonium hydroxide, after which the mixture was stirred for 1 hour. The sol thus produced had a $(ZrO_2+Y_2O_3)$ concentration of 23.7 mass percent, a pH of 10.5, a viscosity of 7.1 mPa·s, and a particle size of 49 nm, as measured by the dynamic light scattering method. The sol was then vacuum concentrated using a rotary evaporator, producing a sol with a $(ZrO_2+Y_2O_3)$ concentration of 39.7 mass percent. The sol thus produced had a pH of 10.6, a viscosity of 50.6 mPa·s, and a particle size of 49 nm, as measured by the dynamic light scattering method, and could be made highly concentrated.

Example 10

Figure 7:
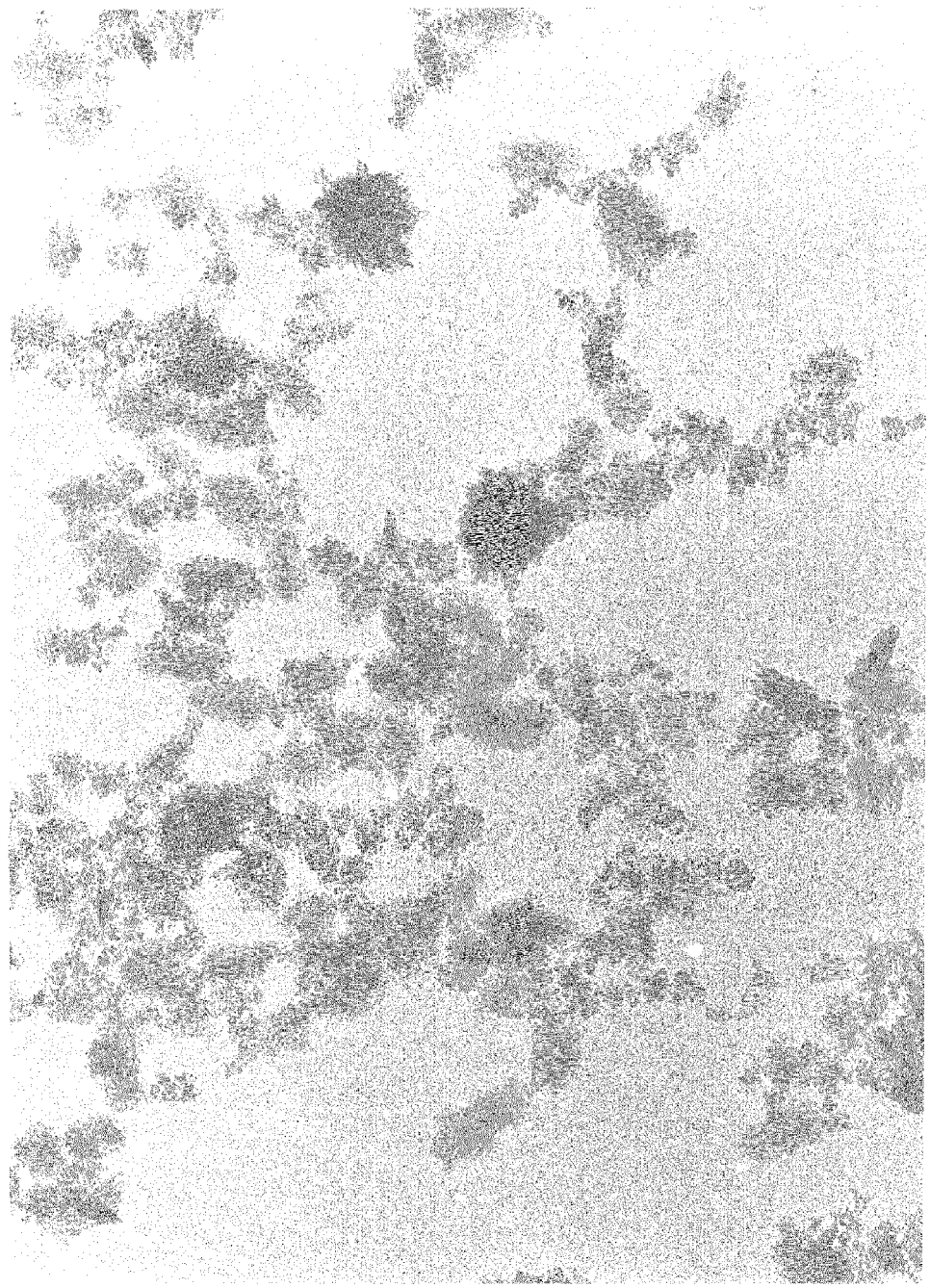
FIG. 7 is an electron photomicrograph showing a particle structure of a complex sol of cerium oxide-zirconium oxide produced in Example 10. The magnification is 200,000 times.

In a 3-liter glass vessel, a dilute aqueous solution was formed by mixing 1528.2 g of an aqueous solution of tetramethyl ammonium hydrogen carbonate (44.5 mass percent as converted to tetramethyl ammonium hydroxide; made by Tama Chemicals Co., Ltd.) and 1115.8 g of pure water. As the aqueous solution was stirred, zirconium oxycarbonate powder ($ZrOCO_3$, containing 42.1 mass percent $ZrO_2$; made by Daiichi Kigenso Kagaku Kogyo Co., Ltd.) was slowly added to the aqueous solution, until a total of 491.2 g had been added. After the addition of zirconium oxycarbonate powder was complete, cerium carbonate powder (50.8 mass percent $CeO_2$; made by AMR Technologies, Inc.) was slowly added to the aqueous solution, until a total of 64.8 g had been added. The $CeO_2$ content of the liquid mixture was 10 mole percent as $CeO_2/(ZrO_2+CeO_2)$, and the pH was 10.0. The liquid mixture was stirred as it was heated to 105° C., after which the mixture was aged for 6 hours at 105° C., with pure water being added as necessary to adjust the concentration. At the point when the aging was complete, the liquid mixture was in a slurry state, with a $(ZrO_2+CeO_2)$ concentration of 7.5 mass percent and a pH of 10.8. The slurry was transferred to a stainless steel autoclave vessel, where a hydrothermal synthesis reaction was carried out for 8 hours at 150° C. while the slurry was stirred. A small amount of undissolved matter was observed in the substance produced by this reaction, but the remaining portion had been completely converted into a sol, containing 7.4 mass percent $(ZrO_2+CeO_2)$, with a pH of 10.8. Next, the sol was left undisturbed to let the undissolved matter settle, after which the undissolved matter was removed. Next, an ultrafiltration device was used to clean and concentrate the sol as pure water was slowly added, producing 669 g of highly concentrated composite sol of cerium oxide-zirconium oxide with a $(ZrO_2+CeO_2)$ concentration of 30.5 mass percent. The sol thus produced had a specific gravity of 1.352, a pH of 8.9, a viscosity of 15.4 mPa·s, a tetramethyl ammonium hydroxide concentration of 0.5 mass percent (measured by titration), and a particle size of 128 nm, as measured by the dynamic light scattering method. In the dynamic light scattering method, when particles are aggregated, the moan particle size of the aggregated particles is measured. When the particles were checked using a transmission electron microscope, nearly all primary particles with a size of around 10 nm had aggregated or combined into aggregated particles, with the size of a single aggregated particle ranging from 20 nm to 200 nm. FIG. 7 is an electron photomicrograph of the sol (magnified 200,000 times). Also, 2 g of sulfuric acid and 5 g of water were added to 1 g of the sol, heated, and dissolved, after which a dilute solution was formed by dilution with water. When the content of $ZrO_2$ and $CeO_2$ in the dilute solution was measured by the ICP emission spectrometry, the $CeO_2$ content of the liquid mixture was 11.3 mole percent as $CeO_2/$ ($ZrO_2$+$CeO_2$). Also, the sol was stable for at least one month at 50° C., without any sedimentation.

Example 11

Figure 8:
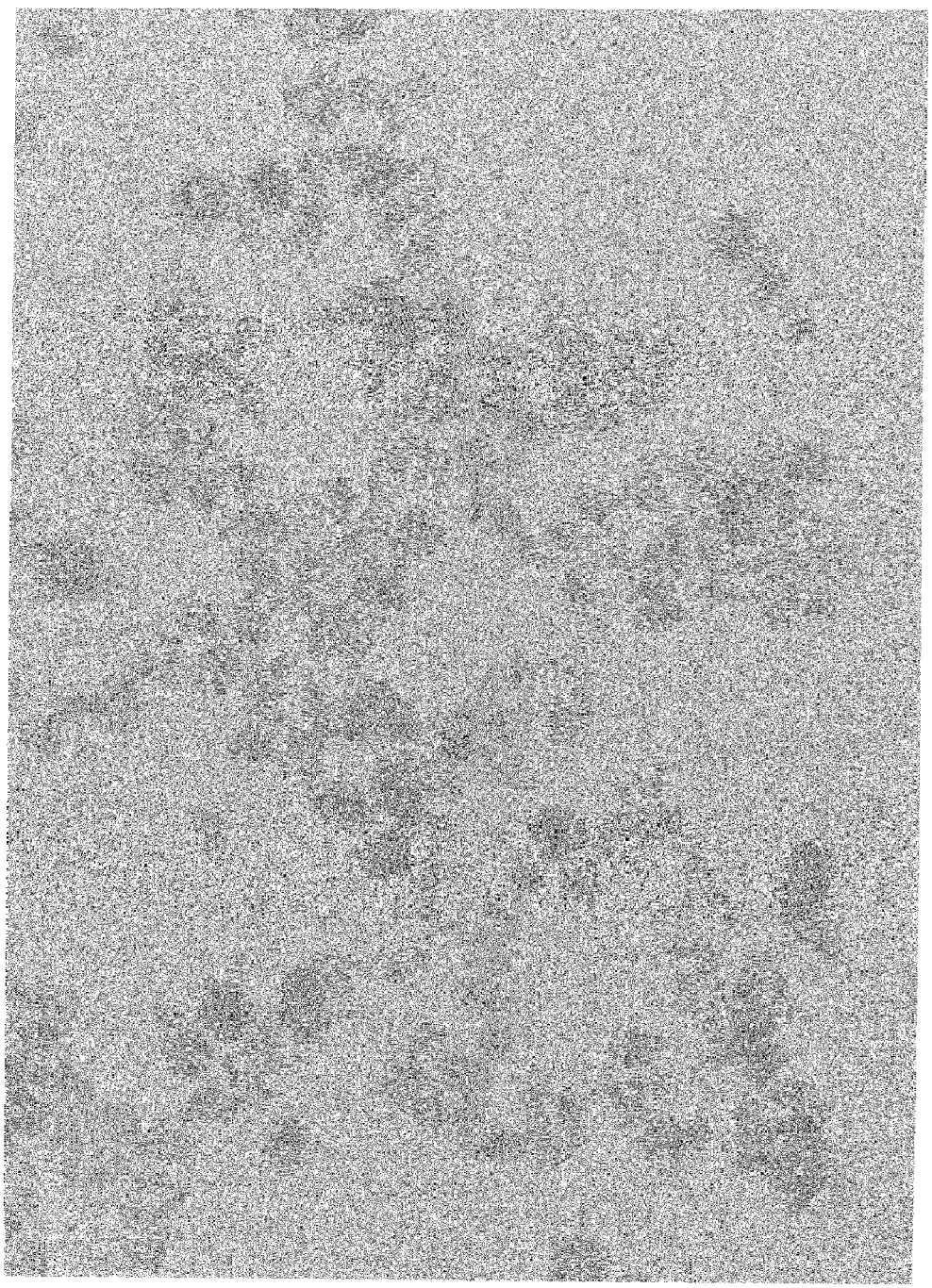
FIG. 8 is an electron photomicrograph showing a particle structure of a complex sol of calcium oxide-zirconium oxide produced in Example 11. The magnification is 200,000 times.

In a 3-liter glass vessel, a dilute aqueous solution was formed by mixing 1636.0 g of an aqueous solution of tetramethyl ammonium hydrogen carbonate (44.5 mass percent as converted to tetramethyl ammonium hydroxide; made by Tama Chemicals Co., Ltd.) and 924.1 g of pure water. As the aqueous solution was stirred, zirconium oxycarbonate powder ($ZrOCO_3$, containing 42.1 mass percent $ZrO_2$; made by Daiichi Kigenso Kagaku Kogyo Co., Ltd.) was slowly added to the aqueous solution, until a total of 526.9 g had been added. After the addition of zirconium oxycarbonate powder was complete, calcium carbonate powder (56.0 mass percent CaO; made by Kanto Chemical Co., Inc.) was slowly added to the aqueous solution, until a total of 20.0 g had been added. The CaO content of the liquid mixture was 10 mole percent as CaO/($ZrO_2$+CaO), and the pH was 10.0. The liquid mixture was stirred as it was heated to 105° C., after which the mixture was aged for 6 hours at 105° C., with pure water being added as necessary to adjust the concentration. At the point when the aging was complete, the liquid mixture was in a slurry state, with a ($ZrO_2$+CaO) concentration of 7.5 mass percent and a pH of 10.8. The slurry was transferred to a stainless steel autoclave vessel, where a hydrothermal synthesis reaction was carried out for 8 hours at 150° C. while the slurry was stirred. A small amount of undissolved matter was observed in the substance produced by this reaction, but the remaining portion had been completely converted into a sol, containing 7.4 mass percent ($ZrO_2$+CaO), with a pH of 10.2. Next, the sol was left undisturbed to let the undissolved matter settle, after which the undissolved matter was removed. Next, an ultrafiltration device was used to clean and concentrate the sol as pure water was slowly added, producing 630 g of highly concentrated composite sol of calcium oxide-zirconium oxide with a ($ZrO_2$+CaO) concentration of 30.5 mass percent. The sol thus produced had a specific gravity of 1.354, a pH of 8.9, a viscosity of 6.0 mPa·s, a tetramethyl ammonium hydroxide concentration of 0.4 mass percent (measured by titration), and a particle size, of 59 nm, as measured by the dynamic light scattering method. In the dynamic light scattering method, when particles are aggregated, the mean particle size of the aggregated particles is measured. When the particles were checked using a transmission electron microscope, nearly all primary particles with a size of around 10 nm had aggregated or combined into aggregated particles, with the size of a single aggregated particle ranging from 20 nm to 100 nm. FIG. 8 is an electron photomicrograph of the sol (magnified 20,000 times). Also, 2 g of sulfuric acid and 5 g of water were added to 1 g of the sol, heated, aid dissolved, after which a dilute solution was formed by dilution with water. When the content of $ZrO_2$ and CaO in the dilute solution was measured by the ICP emission spectrometry, the CaO content of the liquid mixture was 5.9 mole percent as CaO/($ZrO_2$+CaO). Also, the sol was stable for at least one month at 50° C., without any sedimentation.

Example 12

Figure 9:
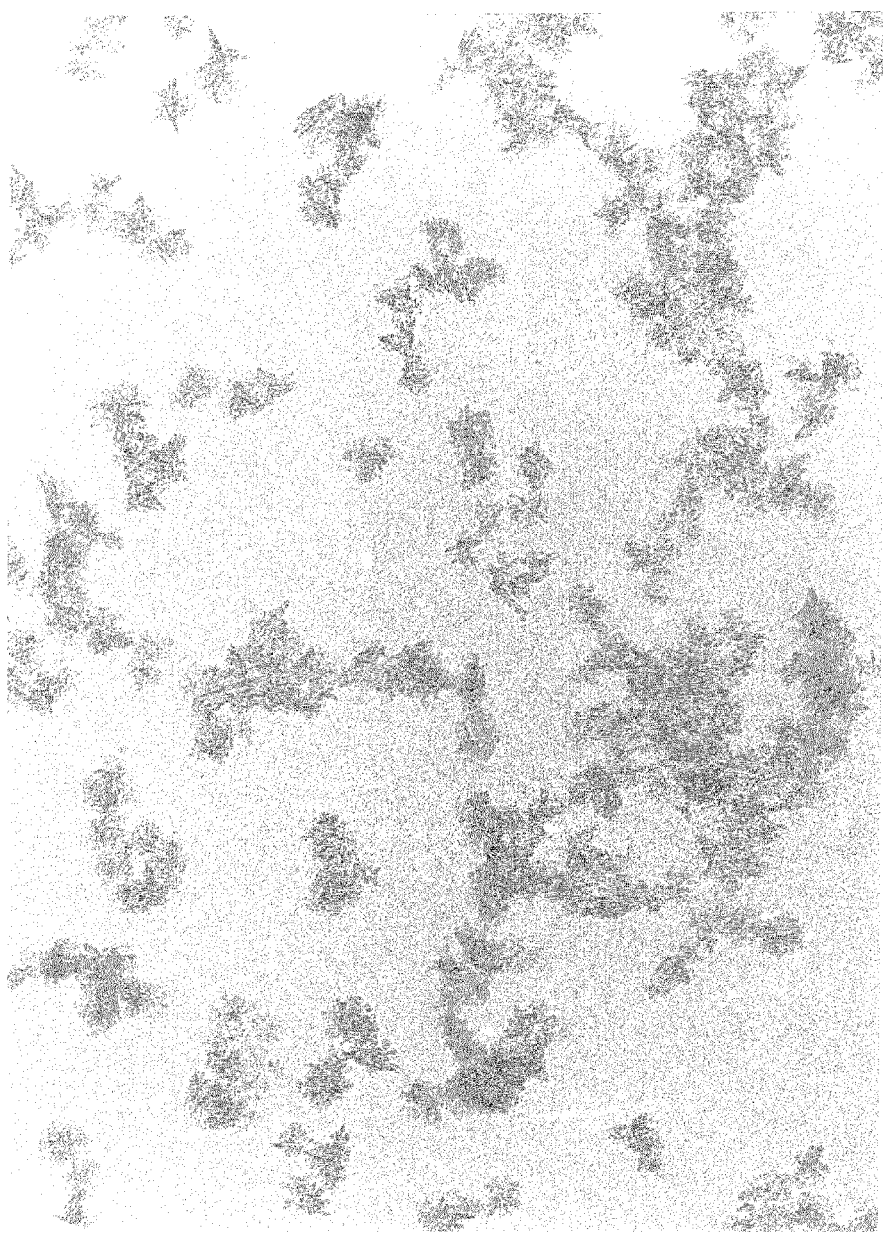
FIG. 9 is an electron photomicrograph showing a particle structure of a complex sol of aluminum oxide-zirconium oxide sol produced in Example 12. The magnification is 200,000 times.

In a 3-liter glass vessel, a dilute aqueous solution was formed by mixing 1636.0 g of an aqueous solution of tetramethyl ammonium hydrogen carbonate (44.5 mass percent as converted to tetramethyl ammonium hydroxide; made by Tama Chemicals Co., Ltd.) and 924.1 g of pure water. As the aqueous solution was stirred, zirconium oxycarbonate powder ($ZrOCO_3$, containing 42.1 mass percent $ZrO_2$; made by Daiichi Kigenso Kagaku Kogyo Co., Ltd.) was slowly added to the aqueous solution, until a total of 526.9 g had been added. After the addition of zirconium oxycarbonate powder was complete, dry aluminum hydroxide powder (containing 55.1 mass percent $Al_2O_3$; made by Kyowa Chemical Industry Co., Ltd.) was slowly added to the aqueous solution, until a total of 37.0 g had been added. The $Al_2O_3$ content of the liquid mixture was 10 mole percent as $Al_2O_3$/($ZrO_2$+$Al_2O_3$), and the pH was 10.3. The liquid mixture was stirred as it was heated to 105° C., after which the mixture was aged for 6 hours at 105° C., with pure water being added as necessary to adjust the concentration. At the point when the aging was complete, the liquid mixture was in a slurry state, with a ($ZrO_2$+$Al_2O_3$) concentration of 7.5 mass percent and a pH of 10.8. The slurry was transferred to a stainless steel autoclave vessel, where a hydrothermal synthesis reaction was carried out for 8 hours at 150° C. while the slurry was stirred. A small amount of undissolved matter was observed in the substance produced by this reaction, but the remaining portion had been completely converted into a sol, containing 7.4 mass percent ($ZrO_2$+$Al_2O_3$), with a pH of 10.2. Next, the sol was left undisturbed to let the undissolved matter settle, after which die undissolved matter was removed. Next, an ultrafiltration device was used to clean and concentrate the sol as pure water was slowly added, producing 836 g of highly concentrated composite sol of aluminum oxide-zirconium oxide with a ($ZrO_2$+$Al_2O_3$) concentration of 24.4 mass percent. The sol thus produced had a specific gravity of 1.259, a pH of 9.1, a viscosity of 13.1 mPa·s, a tetramethyl ammonium hydroxide concentration of 0.6 mass percent (measured by titration), and a particle size of 106 nm, as measured by the dynamic light scattering method. In the dynamic light scattering method, when particles are aggregated, the mean particle size of the aggregated particles is measured. When the particles were checked using a transmission electron microscope, nearly all primary particles with a size of around 10 nm had aggregated or combined into aggregated particles, with the size of a single aggregated particle ranging from 20 nm to 100 nm. FIG. 9 is an electron photomicrograph of the sol (magnified 200,000 times). Also, 2 g of sulfuric acid and 5 g of water were added to 1 g of the sol, heated, and dissolved, after which a dilute solution was formed by dilution with water. When the Content of $ZrO_2$ and $Al_2O_3$ in the dilute solution was measured by the ICP emission spectrometry, the $CeO_2$ content of the liquid mixture was 12.1 mole percent as $Al_2O_3$/($ZrO_2$+$Al_2O_3$). Also, the sol was stable for at least one month at 50° C., without any sedimentation.

Example 13

In a 3-liter glass vessel, a dilute aqueous solution was formed by mixing 1190 g of an aqueous solution of tetramethyl ammonium hydrogen carbonate (44.5 mass percent as converted to tetramethyl ammonium hydroxide; made by Tama Chemicals Co., Ltd.) and 982 g of pure water. As the aqueous solution was stirred, zirconium carbonate powder ($ZrOCO_3$, containing 42.1 mass percent $ZrO_2$; made by Daiichi Kigenso Kagaku Kogyo Co., Ltd.) was slowly added to the aqueous solution, until a total of 364.0 g had been added. After the addition of zirconium carbonate powder was complete, the solution was heated to 80° C. and aged for 1 hour. Next, 44.3 g of metastannic acid (containing 37.6 g of $SnO_2$) was slowly added, and the solution was circulated as it was heat cured for 5 hours.

Figure 10:
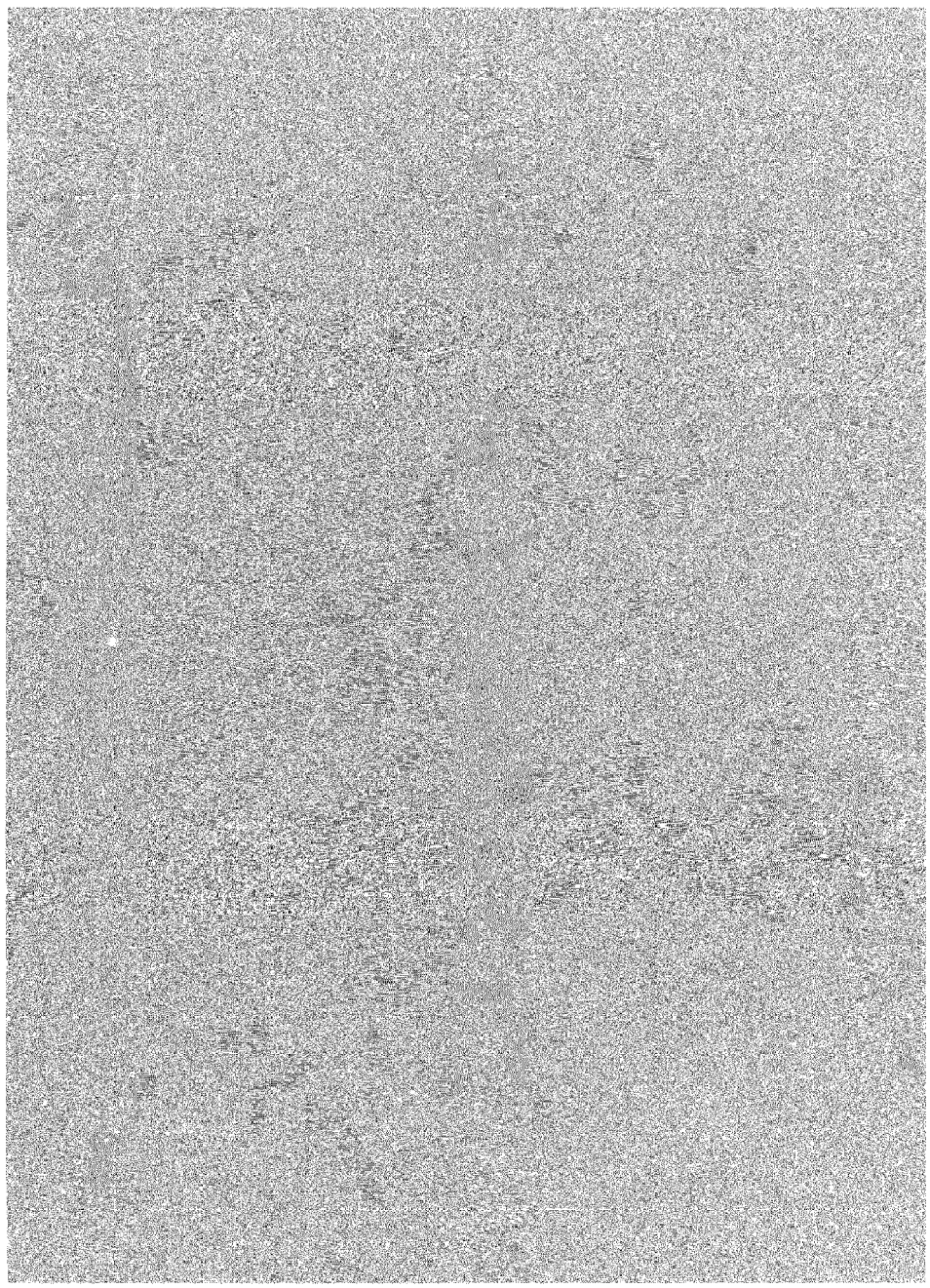
FIG. 10 is an electron photomicrograph showing a particle structure of a complex sol of tin oxide-zirconium oxide produced in Example 13. The magnification is 200,000 times.

At the point when the aging was complete, the liquid mixture was in a slurry state, with a ($ZrO_2$+$SnO_2$) concentration of 7.0 mass percent and a pH of 10.6. The slurry was transferred to a 3-liter stainless steel autoclave vessel, where a hydrothermal synthesis reaction was carried out for 5 hours at 150° C. while the slurry was stirred. The substance produced by this reaction contained 6.8 mass percent ($ZrO_2+SnO_2$), with a pH of 10.0. Next, an ultrafiltration device was used to clean and concentrate the sol as pure water was slowly added, producing 1264 g of highly concentrated composite sol of tin oxide-zirconium oxide with a ($Zr)_2+SnO_2$) concentration of 12.5 mass percent. The sol thus produced had a pH of 8.5, a viscosity of 2.0 mPa·s, a particle size of 5 nm to 50 nm as measured by a transmission electron microscope, and a particle size of 0.20 nm as measured by the dynamic light scattering method. In the dynamic light scattering method, when particles are aggregated, the mean particle size of the aggregated particles is measured. FIG. 10 is an electron photomicrograph of the sol (magnified 200,000 times).

Example 14

Manufacture of Coating Material A/Manufacture of Antimony Pentoxide

In a 100-titer vessel, 12.5 kg of antimony trioxide (containing 99.5 mass percent $Sb_2O_3$; made by GuangDong Mikuni Antimony Industries Co., Ltd.) was mixed with 66.0 kg of pure water and 2.5 kg of potassium hydroxide (containing 95 mass percent KOH). As the mixture was stirred, 8.4 kg of 35% hydrogen peroxide was slowly added. An aqueous solution of potassium antimonate was thus produced containing 15.25 mass percent $Sb_2O_5$ and 5.36 mass percent potassium hydroxide. The mole ratio of $K_2O$ to $Sb_2O_5$ was 1.0.

The aqueous solution of potassium antimonate thus produced was diluted to 2.5 mass percent and passed through a column filled with a cationic ion exchange resin. After ion exchange, 6.6 kg of di-isopropylamine was added to the antimonate solution as the solution was stirred, producing an antimony pentoxide colloidal solution containing an alkaline constituent. The concentration of $Sb_2O_5$ was 1.8 mass percent, and the di-isopropylamine content was 1.2 mass percent. The mole ratio of di-isopropylamine to $Sb_2O_5$ was 1.69, and the primary particle size was 1 nm to 10 nm, as measured by a transmission electron microscope.

(Manufacture of Coating Material B/Adjustment of Antimony Pentoxide-Silica Composite Colloid)

546 g of an aqueous solution of potassium silicate (containing 15.4 mass percent $SiO_2$) was diluted with 542 g of pure water. An aqueous solution of potassium antimonate (containing 14.6 mass percent $Sb_2O_5$) was then mixed in as the solution was stirred. Stirring was continued for 1 hour, producing a mixed aqueous solution of potassium silicate and potassium antimonate.

The mixed aqueous solution of potassium silicate and potassium antimonate thus produced was diluted with pure water to 5 mass percent and passed through a column filled with a cationic ion exchange resin to produce an antimony pentoxide-silica composite colloid.

(Manufacture of Denatured Sol)

As 416.0 g of the aqueous colloidal solution of antimony pentoxide (containing 5.0 g of $Sb_2O_5$) produced in the manufacture of the coating material A was stirred, 400.0 g of the complex sol of tin oxide-zirconium oxide (containing 50.0 g of $ZrO_2$) produced in Example 13, diluted with pure water to 5000 g, was added and mixed such that the mass ratio of $Sb_2O_5$ to $ZrO_2$ was 0.1. The mixture was then heat cured for 2 hours at 95° C. hydrothermal processing was then carried out for 5 hours at 240° C.

The sol thus produced was then slowly added to and mixed with 250.0 g of the antimony pentoxide-silica composite colloid (containing 5.0 g of $Sb_2O_5+SiO_2$) produced in the manufacture of the coating material B, the mixture being stirred as the sol was added, such that the mass ratio of $Sb_2O_5+SiO_2$ to $ZrO_2+SnO_2$ was 0.1. The mixture was then heat cured for 2 hours at 95° C.

The denatured aqueous complex sol of tin oxide-zirconium oxide (dilute solution) thus produced was then concentrated using a filtration device with an ultrafiltration membrane with a molecular weight cut-off of 100,000, producing 530 g of highly concentrated denatured complex sol of tin oxide-zirconium oxide. The sol was stable at a specific gravity of 1.097, a viscosity of 1.4 mPa·s, a pH of 8.2, a particle size of 18.5 nm, as measured by the dynamic light scattering method, and a metal oxide concentration of 11.0 mass percent. In the dynamic light scattering method, when particles are aggregated, the mean particle size of the aggregated particles is measured.

The water in 530 g of the highly concentrated denatured aqueous complex sol of tin oxide-zirconium oxide was removed by slowly adding 7 liters of methanol to the sol under slightly reduced pressure in a rotary evaporator, thereby producing 210 g of denatured composite methanol sol of tin oxide-zirconium oxide in which the aqueous sol had been replaced by methanol. The denatured composite methanol sol of tin oxide-zirconium oxide had a specific gravity of 1.016, a viscosity of 2.3 mPa·s, a pH of 7.9 (a mixture of a mass equal to water), a concentration of 24.8 mass percent converted to metal oxide, and a water content of 1.0 mass percent. The sol exhibited a colloid color, had high transparency, and was stable, with no abnormalities such as the formation of sediment, white turbidity, increased viscosity, or the like observed after the sol had been left at room temperature for 3 months.

Example 15

The water in 221.6 g of the aqueous zirconia sol produced in Example 1 was removed by slowly adding 5.8 liters of methanol to the sol under slightly reduced pressure in a rotary evaporator, thereby producing 280 g of methanol zirconia sol in which the aqueous sol had been replaced by methanol. The methanol zirconia sol had a $ZrO_2$ concentration of 38.7 mass percent, a specific gravity of 1.227, a viscosity of 4.9 mPa·s, a pH of 11.2 (a mixture of a mass equal to water), a water content of 1.0 mass percent, and a particle size of 80 nm, as measured by the dynamic light scattering method. In the dynamic light scattering method, when particles are aggregated, the mean particle size of the aggregated particles is measured. Also, the methanol zirconia sol was stable for at least one month at 50° C., without any sedimentation.

Example 16

295 g of the zirconia sol produced in Example 1 was placed in a stainless steel vessel and dried in a dryer for 3 hours at 120° C., after which it was pulverized in a mixer to produce 160 g of zirconia powder. The dry powder was placed in an electric furnace and heated from room temperature at a rate of 4° C. per minute until the temperature reached 700° C. The powder was then baked at that temperature for 5 hours to produce 144 g of baked zirconia powder. Next, 10.5 g of 10 mass percent nitric acid aqueous solution and 145.5 g of pure water were placed in a 500 ml vessel. The baked zirconia powder was slowly added to this dilute solution as the solution was strongly agitated in a disperser, until a total of 144 g had been added. The solution was then stirred for 30 minutes.

At the point when the stirring was complete, the liquid mixture was in a slurry state, with a $ZrO_2$ concentration of 48.0 mass percent and a pH of 1.8. 300 g of the slurry and 700 g of hard zirconia beads 5 mm in diameter were placed in a sand mill vessel having a diameter of 9 cm. Sand milling was carried out for 14 hours at a revolution speed of 1000 rpm. The slurry solution was converted into a colloidal zirconia solution in which almost no unpulverized baked zirconia was observed. Next, nylon mesh was used to separate the beads from the solution, and 310 g of highly concentrated zirconia sol with a $ZrO_2$ concentration of 45.7 mass percent was collected. The zirconia sol had a specific gravity of 1.612, a pH of 3.4, a viscosity of 3.7 mPa·s, $NO_3$ content of 0.3 mass percent, and a particle size of 105 nm, as measured by the dynamic light scattering method. The size of the particles in the sol was measured by the dynamic light scattering method, and when particles aggregated, the mean particle size of the aggregated particles was measured. Also, the zirconia sol was stable for at least one month at 50° C., without any sedimentation.

Comparative Example 1

In a 3-liter glass vessel, a dilute aqueous solution was formed by mixing 950 g of an aqueous solution of tetramethyl ammonium hydrogen carbonate (44.5 mass percent as converted to tetramethyl ammonium hydroxide; made by Tama Chemicals Co., Ltd.) and 950 g of pure water. As the aqueous solution was stirred at room temperature, zirconium oxycarbonate powder ($ZrOCO_3$, containing 42.1 mass percent $ZrO_2$; made by Daiichi Kigenso Kagaku Kogyo Co., Ltd.) was slowly added to the aqueous solution, until a total of 585.2 g had been added. The solution was then stirred for 30 minutes. At the point when the stirring was complete, the liquid mixture was in a slurry state, with a $ZrO_2$ concentration of 9.9 mass percent and a pH of 9.3. The slurry was transferred to a stainless steel autoclave vessel, where a hydrothermal synthesis reaction was carried out for 3 hours at 140° C. while the slurry was stirred. The substance produced by this reaction was close to being in a slurry state, containing undissolved matter, and sedimentation occurred when the substance was left undisturbed.

Comparative Example 2

In a 3-liter glass vessel, a dilate aqueous solution was formed by mixing 1657.6 g of an aqueous solution of 2.5 mass percent tetramethyl ammonium hydroxide (made by Tama Chemicals Co., Ltd.) and 185.6 g of pure water. The aqueous solution was stirred as it was heated to 95° C., then zirconium oxycarbonate powder ($ZrOCO_3$, containing 42.1 mass percent $ZrO_2$; made by Daiichi Kigenso Kagaku Kogyo Co., Ltd.) was slowly added to the aqueous solution, until a total of 556.8 g had been added. After the addition of zirconium oxycarbonate powder was complete, heat aging was continued, with pure water being added as necessary to adjust the concentration, until the solution was aged for 3 hours at 95° C. At the point when the aging was complete, the liquid mixture was in a slurry state, containing 10.0 mass percent $ZrO_2$ with a pH of 14 or higher. The slurry was transferred to a stainless steel autoclave vessel, where a hydrothermal synthesis reaction was carried out for 3 hours at 140° C. while the slurry was stirred. The substance produced by this reaction was close to being in a slurry state, containing undissolved matter, and was seen to separate into two layers when left undisturbed.

Comparative Example 3

In a 3-liter glass vessel, a dilute aqueous solution was formed by mixing 331.0 g of ammonium carbonate (containing 30 mass percent ammonia) and 1903.0 g of pure water. The aqueous solution was stirred as it was heated to 95° C., then zirconium oxycarbonate powder ($ZrOCO_3$, containing 42.1 mass percent $ZrO_2$; made by Daiichi Kigenso Kagaku Kogyo Co., Ltd.) was slowly added to the aqueous solution, until a total of 712.6 g had been added. After the addition of zirconium oxycarbonate powder was complete, heat aging was continued, with pure water being added as necessary to adjust the concentration, until the solution was cured for 3 hours at 95° C. At the point when the aging was complete, the liquid mixture was in a slurry state, containing 10.0 mass percent $ZrO_2$, with a pH of 8.6. The slurry was transferred to a stainless steel autoclave vessel, where a hydrothermal synthesis reaction was carried out for 3 hours at 140° C. while the slurry was stirred. The substance produced by this reaction was close to being in a slurry state, containing undissolved matter, and was seen to separate into two layers when left undisturbed.

INDUSTRIAL APPLICABILITY

The metal oxide sols produced by the present invention can be used as raw materials for ceramics, for electronic materials such as sensors or the like, and for other materials, as coating agents, as composite materials, as binders for flame-resistant molded products and casting molds, and as abrading agents.

The invention claimed is:

1. A method for producing metal oxide sols comprising the steps of:
heating a metal compound at a temperature of 60° C. to 110° C. in an aqueous medium that contains a carbonate of quaternary ammonium; and
carrying out hydrothermal processing at a temperature of 110° C. to 250° C.

2. The method for producing metal oxide sols according to claim 1, wherein the carbonate of quaternary ammonium is $(NR_4)_2CO_3$ or $NR_4HCO_3$ in which R represents a hydrocarbon group, or a mixture thereof.

3. The method for producing metal oxide sols according to claim 1, wherein the quaternary ammonium ion in the carbonate of quaternary ammonium includes a hydrocarbon group containing from one to eighteen carbon atoms.

4. The method for producing metal oxide sols according to claim 1, wherein the quaternary ammonium ion in the carbonate of quaternary ammonium includes a hydrocarbon group containing from one to four carbon atoms.

5. The method for producing metal oxide sols according to claim 1, wherein the metal compound is one, or two or more metal compounds selected from a group of compounds based on a metal having a valence that is bivalent, trivalent, or tetravalent.

6. The method for producing metal oxide sols according to claim 5, wherein the metal compound based on a metal having a valence that is bivalent, is a magnesium compound, a calcium compound, a barium compound, a zinc compound, or a nickel compound.

7. The method for producing metal oxide sols according to claim 5, wherein the metal compound based on a metal having a valence that is trivalent, is an yttrium compound, an aluminum compound, an indium compound, an iron compound, a cobalt compound, a cerium compound, or a bismuth compound.

8. The method for producing metal oxide sols according to claim 5, wherein the metal compound based on a metal having a valence that is tetravalent, is a titanium compound, a zirconium compound, a silicon compound, a tin compound, or a cerium compound.

9. The method for producing metal oxide sols according to claim 1, wherein the metal compound is a calcium compound, an aluminum compound, an yttrium compound, a cerium compound, a tin compound, a zirconium compound, or a combination thereof.

10. The method for producing metal oxide sols according to claim 1, wherein the metal oxide is a single metal oxide or a composite metal oxide.

11. The method for producing metal oxide sols according to claim 1, further comprising a washing step after the heating step.

12. The method for producing metal oxide sols according to claim 11, further comprising a concentrating process after the washing step, after which steps pH of the metal oxide sols is 8 to 11.

* * * * *